United States Patent
Ros-Giralt et al.

(10) Patent No.: US 11,463,352 B1
(45) Date of Patent: Oct. 4, 2022

(54) MANIPULATING BOTTLENECKS IN SYSTEMS MODELED AS NETWORKS

(71) Applicant: Reservoir Labs, Inc., New York, NY (US)

(72) Inventors: Jordi Ros-Giralt, Newport Beach, CA (US); Noah Amsel, New York, NY (US); Richard A. Lethin, New York, NY (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/459,387

(22) Filed: Aug. 27, 2021

Related U.S. Application Data

(60) Provisional application No. 63/106,141, filed on Oct. 27, 2020.

(51) Int. Cl.
| | |
|---|---|
| *H04L 45/00* | (2022.01) |
| *H04L 47/122* | (2022.01) |
| *H04L 45/02* | (2022.01) |
| *H04L 45/24* | (2022.01) |

(52) U.S. Cl.
CPC .............. *H04L 45/38* (2013.01); *H04L 45/02* (2013.01); *H04L 45/22* (2013.01); *H04L 45/24* (2013.01); *H04L 47/122* (2013.01)

(58) Field of Classification Search
CPC ......... H04L 45/02; H04L 45/22; H04L 45/24; H04L 45/38; H04L 47/122
See application file for complete search history.

(56) References Cited

U.S. PATENT DOCUMENTS

| | | | | |
|---|---|---|---|---|
| 9,497,039 | B2* | 11/2016 | Greenberg | H04L 45/16 |
| 9,705,798 | B1* | 7/2017 | Abts | H04L 43/0888 |
| 9,929,960 | B1* | 3/2018 | Abts | H04L 47/122 |
| 9,960,878 | B2* | 5/2018 | Gumaste | H04Q 11/0005 |
| 10,797,943 | B2* | 10/2020 | Fawcett | H04L 41/0843 |
| 10,904,077 | B2* | 1/2021 | Fawcett | H04L 41/0803 |
| 11,075,798 | B2* | 7/2021 | Fawcett | H04L 41/0803 |
| 2019/0304162 | A1* | 10/2019 | Bakalash | G06T 15/04 |
| 2022/0078130 | A1* | 3/2022 | Ros-Giralt | H04L 47/762 |

OTHER PUBLICATIONS

Jordi Ros-Giralt et al. "On the Bottleneck Structure of Congestion-Controlled Networks", Proc. ACM Meas. Anal. Comput. Syst., vol. 3, No. 3, Article 59, Dec. 2019, 31 pages. (Year: 2019).*
Mohammad Al-Fares et al. "Hedera: Dynamic Flow Scheduling for Data Center Networks", 2010, 15 pages. (Year: 2010).*
Noah Amsel et al. "Computing Bottleneck Structures at Scale for High-Precision Network Performance Analysis", 7th Annual International Workshop on Innovating the Network for Data-Intensive Science, Nov. 2020, 34 pages. (Year: 2020).*
Jordi Ros-Giralt et al. "GradientGraph: A Network Optimization Framework for High-Precision Analysis of Bottleneck and Flow Performance", Supercomputing INDIS Workshop 2019, Nov. 18, 2019, 40 pages. (Year: 2019).*

* cited by examiner

*Primary Examiner* — George C Neurauter, Jr.
(74) *Attorney, Agent, or Firm* — Seyfarth Shaw LLP

(57) ABSTRACT

A technique is described for quantifying the effect of a perturbation on a property of a network link or flow, and to add a new flow, reroute an existing flow, or to reshape a flow, based on a quantitative estimation of the perturbation.

20 Claims, 22 Drawing Sheets
(12 of 22 Drawing Sheet(s) Filed in Color)

Algorithm 1A GradientGraph

Input: $\mathcal{N} = (\mathcal{L}, \mathcal{F}, \{c_l, \forall l \in \mathcal{L}\})$;

1: $\mathcal{L}^0 = \mathcal{L}; C^0 = \{\emptyset\}; k = 0;$
2: $E = \{\emptyset\};$
3: while $C^k \neq \mathcal{F}$ do
4:     $s_l^k = (c_l - \sum_{\forall f \in C^k \cap \mathcal{F}_l} r_f) / |\mathcal{F}_l \setminus C^k|, \forall l \in \mathcal{L}^k;$
5:     $u_l^k = \min\{s_{l'}^k \mid \mathcal{F}_{l'} \cap \mathcal{F}_l \neq \{\emptyset\}, \forall l' \in \mathcal{L}^k\}, \forall l \in \mathcal{L}^k;$
6:     for $l \in \mathcal{L}^k, s_l^k = u_l^k$ do
7:         $r_f = s_l^k, \forall f \in \mathcal{F}_l \setminus C^k;$
8:         $E = E \cup \{(l, f), \forall f \in \mathcal{F}_l \setminus C^k\};$
9:         $E = E \cup \{(f, l'), \forall f \in \mathcal{F}_l \setminus C^k \text{ and } \forall l' \in \mathcal{L}_f \mid s_{l'}^k \neq u_{l'}^k\};$
10:        $\mathcal{L}^k = \mathcal{L}^k \setminus \{l\};$
11:        $C^k = C^k \cup \{f, \forall f \in \mathcal{F}_l\};$
12:     end for
13:     $\mathcal{L}^{k+1} = \mathcal{L}^k; C^{k+1} = C^k;$
14:     $k = k + 1;$
15: end while
16: $\mathcal{V} = \mathcal{L} \setminus \mathcal{L}^k \cup \mathcal{F}; s_l = s_l^k, \forall l \in \mathcal{B};$
17: $\mathcal{G} = (\mathcal{V}, E);$
18: return $(\mathcal{G}, \{s_l, \forall l \in \mathcal{L}\}, \{r_f, \forall f \in \mathcal{F}\});$

FIG. 1A

Algorithm 1B GradientGraph($\mathcal{N} = \langle \mathcal{L}, \mathcal{F}, \{c_l, \forall l \in \mathcal{L}\} \rangle$)

1: $\mathcal{V} = \emptyset;\ E = \emptyset;\ r_f = \infty, \forall f \in \mathcal{F};$
2: for $l \in \mathcal{L}$ do
3:    $a_l = c_l;$     # available capacity
4:    $s_l = a_l/|\mathcal{F}_l|;$   # fair share
5:    MinHeapAdd(key = $s_l$, value= $l$);
6: end for
7: while $\mathcal{F} \nsubseteq \mathcal{V}$ do
8:    $l$ = MinHeapPop();
9:    for $f \in \mathcal{F}_l$ such that $r_f \geq s_l$ do
10:      $E = E \cup \{(l, f), (f, l)\};$
11:      if $f \notin \mathcal{V}$ then
12:         $r_f = s_l;$
13:         $\mathcal{V} = \mathcal{V} \cup \{f\};$
14:         for $l' \in \mathcal{L}_f$ such that $r_f < s_{l'}$ do
15:            $E = E \cup \{(f, l')\}$
16:            $a_{l'} = a_{l'} - s_l$
17:            $s_{l'} = a_{l'}/|\mathcal{F}_{l'} \setminus \mathcal{V}|;$
18:            MinHeapUpdateKey(value = $l'$, newKey = $s_{l'}$);
19:         end for
20:      end if
21:    end for
22:    $\mathcal{V} = \mathcal{V} \cup \{l\};$
23: end while
24: return $\langle \mathcal{G} = (V, E), \{s_l, \forall l \in \mathcal{L}\}, \{r_f, \forall f \in \mathcal{F}\} \rangle;$

FIG. 1B

Algorithm 2 ForwardGrad($\mathcal{L}, \mathcal{F}, \mathcal{G}, x \in \mathcal{L} \cup \mathcal{F}, \Delta x \in \{\pm 1\}$)

1: $\Delta c_l = 0 \quad \forall l \in \mathcal{L}$
2: $\Delta r_f = 0 \quad \forall f \in \mathcal{F}$ # Drift of flow $f$
3: $\Delta s_l = 0 \quad \forall l \in \mathcal{L}$ # Drift of link $l$
4: if $x \in \mathcal{F}$ then
5: $\quad \Delta u_x = \Delta x$
6: $\quad$ MinHeapAdd(key $= (u_x, \Delta u_x)$, value $= x$)
7: else if $x \in \mathcal{L}$ then
8: $\quad \Delta c_x = \Delta x$
9: $\quad \Delta s_x = \Delta c_x / |\text{successors}(x, \mathcal{G})|$
10: $\quad$ MinHeapAdd(key $= (s_x, \Delta s_x)$, value $= x$)
11: end if
12: $V = \emptyset$ $\quad$ # the set of previously visited nodes
13: repeat
14: $\quad$ repeat
15: $\quad\quad y = $ MinHeapPop(); # Get the next unvisited node
16: $\quad$ until $y \notin \emptyset$
17: $\quad V = V \cup \{y\}$
18: $\quad$ if ($y \in \mathcal{L}$ and $\Delta s_y = 0$) or ($y \in \mathcal{F}$ and $\Delta u_y = 0$) then
19: $\quad\quad$ Continue
20: $\quad$ end if
21: $\quad$ for $y' \in \text{successors}(y, \mathcal{G}) \setminus V$ do
22: $\quad\quad$ if $y' \in \mathcal{F}$ then
23: $\quad\quad\quad \Delta r_{y'} = \min_{l \in \text{predecessors}(y', \mathcal{G})} \Delta s_l$ # Flow equation invariant
24: $\quad\quad\quad$ MinHeapAdd(key $= (r_{y'}, \Delta r_{y'})$, value $= y'$)
25: $\quad\quad$ else if $y' \in \mathcal{L}$ then
26: $\quad\quad\quad \Delta c_{y'} = \Delta c_{y'} - \Delta u_y$
27: $\quad\quad\quad \Delta s_{y'} = \Delta c_{y'} / |\text{successors}(y', \mathcal{G}) \setminus V|$ # Link equation invariant
28: $\quad\quad\quad$ MinHeapAdd(key $= (s_{y'}, \Delta s_{y'})$, value $= y'$)
29: $\quad\quad$ end if
30: $\quad$ end for
31: until MinHeapEmpty()
32: return ($\Delta s_l \quad \forall l \in \mathcal{L}, \quad \Delta r_f \quad \forall f \in \mathcal{F}$)

FIG. 2

Algorithm LeapFold

Input: $\mathcal{N} = \langle \mathcal{L}, \mathcal{F}, \{c_l, \forall l \in \mathcal{L}\}\rangle; x \in \mathcal{L} \cup \mathcal{F};$ 1: $\langle \mathcal{G}, \{s_l, \forall l \in \mathcal{L}\}, \{r_f, \forall f \in \mathcal{F}\}\rangle = GradientGraph(\mathcal{N});$
2: $leap = \infty;$
3: for $l \in \mathcal{L}$ do
4:     for $l' \in LinkSuccessors(\mathcal{G}, l)$ do
5:         $\lambda = (s_l - s'_l)/(\nabla_x(l') - \nabla_x(l));$
6:         if $\lambda < leap$ then
7:             $leap = \lambda;$
8:             $fold = (l, l');$
9:         end if
10:     end for
11: end for
12: return $\langle leap, fold \rangle;$

FIG. 4

Algorithm MinimizeFCT

Input: $\mathcal{N} = \langle \mathcal{L}, \mathcal{F}, \{c_l, \forall l \in \mathcal{L}\}\rangle; f_s \in F; \rho;$ 1: while True do
2:     $f^* = \arg\max_{f \in F} \nabla_f(f_s);$
3:     if $\nabla_{f^*}(f_s) \leq 0$ or $r_s \geq \rho$ then
4:         return $\langle \mathcal{L}, \mathcal{F} \rangle;$
5:     end if
6:     $\langle \mathcal{G}, \{s_l, \forall l \in \mathcal{L}\}, \{r_f, \forall f \in \mathcal{F}\}\rangle = GradientGraph(\mathcal{N});$
7:     $\langle fold, leap \rangle = LeapFold(\mathcal{L}, \mathcal{F}, f^*);$
8:     $k = |\mathcal{L}| + 1;$
9:     $\mathcal{L} = \mathcal{L} \cup \{l_k\};$    # Add the traffic shaper to the network
10:    $f^* = f^* \cup \{l_k\};$   # Ensure flow $f^*$ traverses the traffic shaper
11:    $c_k = r_{f^*} - leap;$ # Set the traffic shaper rate
12: end while
13: return $\langle \mathcal{L}, \mathcal{F} \rangle;$

FIG. 5

Algorithm 3 MaxRatePath($\mathcal{N} = (\mathcal{L}, \mathcal{F}, \{c_l, \forall l \in \mathcal{L}\}), \mathcal{U}, u_s \in \mathcal{U}, u_d \in \mathcal{U}$)

1: $F$ = MinHeap();  # Frontier set
2: $C$ = Set();  # Converged set
3: $d_u = \infty, \forall u \in \mathcal{U}$;  # Initialize distance metric
4: $d_{u_s} = 0$;
5: F.insert(key = 0, value = $u_s$);
6: while $u$ = F.extractMin() do
7:     C.insert($u$);  # Has converged
8:     if $u == u_d$ then
9:         break;
10:     end if
11:     for all $(u, u') \in \mathcal{L}$ and $u' \notin C$ do
12:         $f = \{(x_1, x_2), (x_2, x_3), ..., (x_{i-1}, x_i) \mid x_j \in C, (x_j, x_{j+1}) \in \mathcal{L}, x_1 = u_s, x_{i-1} = u, x_i = u'\}$;
13:         $(\mathcal{G}, \{s_l\}, \{r_f\})$ = GradientGraph($\mathcal{N} = (\mathcal{L}, \mathcal{F} \cup \{f\}, \{c_l, \forall l \in \mathcal{L}\})$);
14:         $distance = 1/r_f$;  # Flow completion time to send 1 bit
15:         if $d_{u'} \leq distance$ then
16:             continue;
17:         end if
18:         $d_{u'} = distance$;
19:         if $u' \notin F$ then
20:             F.insert(key = $d_{u'}$, value = $u'$);
21:         else
22:             F.update(key = $d_{u'}$, value = $u'$);
23:         end if
24:     end for
25: end while
26: $f = \{(x_1, x_2), (x_2, x_3), ..., (x_{i-1}, x_i) \mid x_j \in C, (x_j, x_{j+1}) \in \mathcal{L}, x_1 = u_s, x_i = u_d\}$;
27: return $f$;

FIG. 6

| Flow | Shortest path | Longer path | Flow | Shortest path | Longer path |
|---|---|---|---|---|---|
| $f_1$ | 1.463 / 1.428 | 1.571 / 1.666 | $f_{14}$ | 1.462 / 1.666 | 1.429 / 1.666 |
| $f_2$ | 1.508 / 1.666 | 1.498 / 1.666 | $f_{15}$ | 1.498 / 1.666 | 1.476 / 1.666 |
| $f_3$ | 1.306 / 1.428 | 1.427 / 1.666 | $f_{16}$ | 1.497 / 1.666 | 1.474 / 1.666 |
| $f_4$ | 1.431 / 1.428 | 1.527 / 1.666 | $f_{17}$ | 1.838 / 2.142 | 1.864 / 2.142 |
| $f_5$ | 1.314 / 1.428 | 1.413 / 1.666 | $f_{18}$ | 1.817 / 2.142 | 1.848 / 2.142 |
| $f_6$ | 2.539 / 3.000 | 2.181 / 2.500 | $f_{19}$ | 1.773 / 2.142 | 1.795 / 2.142 |
| $f_7$ | 1.214 / 1.428 | 1.385 / 1.666 | $f_{20}$ | 1.813 / 2.142 | 1.876 / 2.142 |
| $f_8$ | 1.302 / 1.428 | 1.420 / 1.666 | $f_{21}$ | 2.891 / 3.000 | 2.174 / 2.500 |
| $f_9$ | 2.068 / 2.142 | 2.168 / 2.142 | $f_{22}$ | 2.438 / 3.000 | 2.098 / 2.500 |
| $f_{10}$ | 1.580 / 1.666 | 1.465 / 1.666 | $f_{23}$ | 2.550 / 3.000 | 2.129 / 2.500 |
| $f_{11}$ | 1.933 / 2.142 | 1.948 / 2.142 | $f_{24}$ | 2.606 / 3.000 | 2.185 / 2.500 |
| $f_{12}$ | 2.025 / 2.142 | 2.087 / 2.142 | $f_{25}$ | 1.226 / 1.428 | 2.386 / 2.500 |
| $f_{13}$ | 1.497 / 1.666 | 1.481 / 1.666 | | | |

FIG. 9C

Tapering parameter $\tau = 4/3$

Tapering parameter $\tau = 1$

MANIPULATING BOTTLENECKS IN SYSTEMS MODELED AS NETWORKS

CROSS-REFERENCE TO RELATED APPLICATIONS

This application claims priority to and benefit of U.S. Provisional Patent Application No. 63/106,141, titled "Manipulating Bottlenecks in Data Networks," filed on Oct. 27, 2020, the entire contents of which are incorporated herein by reference.

GOVERNMENT LICENSE RIGHTS

This invention was made with government support under Award No. DE-SC0019523 awarded by the U.S. Department of Energy. The government has certain rights in the invention

FIELD

This disclosure generally relates to networking systems and, in particular, to analysis of perturbation of links and/or flows in a network, and to network manipulation.

BACKGROUND

The problem of congestion control is a widely studied areas in data networks. After the earliest congestion control algorithms for the Internet were developed and implemented as part of the TCP protocol, a more than three-decade long period of intense research continued. This has resulted in a long list of congestion control algorithms, including the BBR algorithm recently proposed by Google. Many of these algorithms are based on the belief that the performance of a flow is solely characterized by the state of its bottleneck. The problem of traffic engineering (TE) has also been widely studied and continues to be a very active area of research and development. For instance, Google provides Bandwidth Enforcer (BwE), a centralized bandwidth allocation infrastructure for wide area networking that targets high network utilization.

SUMMARY

Bottleneck links in congestion-controlled networks do not operate as independent resources, however. For instance, Mathis equation does not take into account the system-wide properties of a network, including its topology, the routing and the interactions between flows. In reality, bottleneck links generally operate according to a bottleneck structure described herein that can reveal the interactions of bottleneck links, and the system-wide ripple effects caused by perturbations in the network. Techniques using the bottleneck structure, such as the GradientGraph method described below, can addresses a gap in the analysis performed by the conventional techniques, and can provide an alternative methodology to estimate network flow throughput.

Specifically, we present a quantitative technique for expressing bottleneck structures, a mathematical and engineering framework based on a family of polynomial-time algorithms that can be used to reason and identify optimized solutions in a wide variety of networking problems, including network design, capacity planning, flow control and routing. For each of these applications, we present examples and experiments to demonstrate how bottleneck structures can be practically used to design and optimize data networks. Various techniques described herein take into account the system-wide properties of a network, including its topology, the routing and the interactions between flows, and can numerically estimate flow throughput.

The bottleneck structure of a network can be represented qualitatively, via a bottleneck precedence graph (BPG), a structure that organizes the relationships among links. Techniques disclosed herein feature an enhanced analysis of a bottleneck structure that takes into account the relationships among flows and links, not just links, providing a more comprehensive view of the network or a system modeled as a network. As such, embodiments of this technique may provide a framework to quantify the interactions among flows and links, resulting in a new class of algorithms to optimize network performance.

Accordingly, in one aspect a method is provided for jointly performing routing and congestion control in a system modeled as a network. The method comprising performing by a processor the steps of: receiving, for a system modeled as a network, a network topology, and receiving a request for routing a flow between a source node and a destination node. The network topology may include several nodes, a number of links between respective pairs of nodes, and a number of flows via the several links. The method also includes the step of selecting a path for the flow based on a maximum achievable flow rate therefor. The maximum achievable flow rate is derived by generating a bottleneck structure of the network that is modified to have the network topology and the flow.

The flow may include a new flow or an existing flow. In the latter case, the method may further include removing the existing flow from the several flows in the network topology. The removing step is performed before the selecting step. Each link in the number of links may represent a respective availability of a system resource. A respective flow rate associated with each flow in the number of flows may represent a respective utilization of one or more system resources. The selected path may be different from a shortest hop path between the source node and the destination node.

In some embodiments, the bottleneck structure includes several link elements and several flow elements. A dependence from a first link element to a first flow element may indicate that a first flow corresponding to the first flow element is bottlenecked at a first link corresponding to the first link element. A dependance from a second flow element to a second link element may indicate that a second flow corresponding to the second flow element traverses a second link corresponding to the second link element.

In some embodiments, the method further includes selecting, from the several flows, a flow to be accelerated, and determining, by traversing the bottleneck structure, a target flow associated with a positive flow gradient. The these embodiments, the method also includes computing a leap and a fold for the target flow. The leap may represent a maximum perturbation of flow rate of the target flow while maintaining the relative order of the several links according to their respective fair shares. The method may also include reducing flow rate of the target flow using a traffic shaper by a factor up to the leap, and increasing flow rate of the flow to be accelerated up to a product of the leap and a gradient of the flow to be accelerated.

The factor may be selected to preserve completion time of slowest of the several flows. The method may further include repeating the determining, computing, reducing, and increasing steps with respect to a different target flow. The system modeled as a network may include a system modeled as: a data network, a transportation network, an energy distribution network, a fluidic network, or a biological network.

In another aspect, an apparatus is provided for jointly performing routing and congestion control in a system modeled as a network. The apparatus includes a first processor and a first memory in electrical communication with the first processor. The first memory includes instructions that, when executed by a processing unit that includes one or more computing units, where one of such computing units may include the first processor or a second processor, and where the processing unit is in electronic communication with a memory module that includes the first memory or a second memory, program the processing unit to: receive, for a system modeled as a network, a network topology, and a request for routing a flow between a source node and a destination node.

The network topology may include several nodes, a number of links between respective pairs of nodes, and a number of flows via the several links. The instructions also program the processing unit to select a path for the flow based on a maximum achievable flow rate therefor. The maximum achievable flow rate is derived by generating a bottleneck structure of the network modified to have the network topology and the flow. In various embodiments, the instructions can program the processing unit to perform one or more of the method steps described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 1A and 1B show different embodiments of a procedure to construct a gradient graph used in analysis and manipulation of a network;

FIG. 2 shows different embodiments of a procedure to compute link and flow gradients using a gradient graph;

FIG. 4 presents a procedure to determine leaps and folds associated with flows and links, according to various embodiments;

FIG. 5 presents a procedure to optimize a flow using flow and link gradients, according to various embodiments;

FIG. 6 presents a procedure to compute a maximum achievable flow rate for a flow in a network, using a gradient graph of the network, according to various embodiments;

FIG. 9C shows a comparison of experimental vs theoretical flow rates achieved for several flows;

DETAILED DESCRIPTION

1 Introduction

Figures 3A, 3B, 3C, 3D:
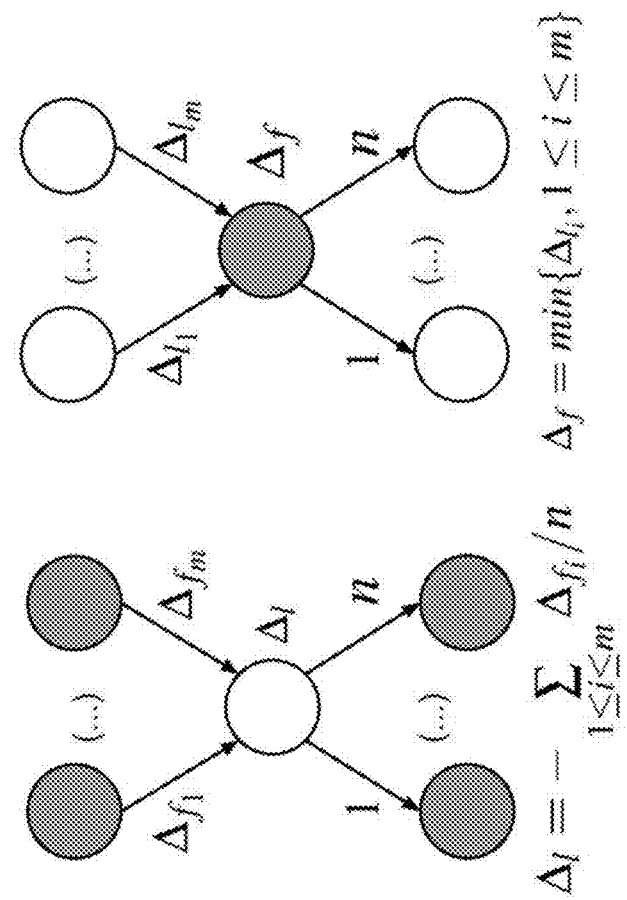
FIGS. 3A and 3B illustrate analysis of bottleneck links and bottleneck flows, according to various embodiments.
FIGS. 3C and 3D illustrate computation of gradients for the links and flows depicted in FIGS. 3A and 3B, according to various embodiments.

Research on the problem of congestion control for data networks is generally based on the principle that the performance of a flow is solely determined by the state of its bottleneck link. This view was presented in one of the earliest congestion control algorithm. This helped the Internet recover from congestion collapse in 1988, and this view persisted throughout the more than 30 years of research and development that followed, including Google's new BBR algorithm. While it is generally true that a flow's performance is limited by the state of its bottleneck link, we describe a deeper view of network behavior, describing how bottlenecks interact with each other through a latent structure—called the bottleneck structure—that depends on the topological, routing, and flow control properties of the network. This latent structure explains how the performance of one bottleneck can affect other bottlenecks, and provides a framework to understand how perturbations in the capacity of a link or the rate of a flow propagate through a network, affecting other links and flows.

A related structure is described in co-pending U.S. patent application Ser. No. 16/580,718, (the "'718 application) titled "Systems and Methods for Quality of Service (QoS) Based Management of Bottlenecks and Flows in Networks," filed on Sep. 24, 2019, which is incorporated herein by reference. The '718 application generally describes qualitative properties of the bottleneck precedence graph (BPG), a structure that analyzes the relationships among links. The '718 application is incorporated herein by reference in its entirety.

In the discussion below we present a quantitative theory of bottleneck structures (QTBS), a mathematical framework that yields a set of polynomial time and/or memory-efficient algorithms for quantifying the ripple effects of perturbations in a network. Perturbations can either be unintentional (such as the effect of a link failure or the sudden arrival of a large flow in a network) or intentional (such as the upgrade of a network link to a higher capacity or the modification of a route with the goal of optimizing performance). With QTBS, a network operator can quantify the effect of such perturbations and use this information to optimize network performance.

The techniques described herein are generally applicable to networks that transport commodity flows and also to systems that can be modeled as networks. In addition to communication networks, examples include (but are not limited to) vehicle networks, energy networks, fluidic networks, and biological networks. For example, the problem of vehicle networks generally involves identifying optimized designs of the road system that allows for a maximal amount of vehicles that can circulate through the network without congesting it or, similarly, minimizing the level of congestion for a given amount of circulating vehicles. In this case, vehicles are analogous to packets in a data network, while flows correspond to the set of vehicles going from location A to location B at a given time that follow the same path.

The capacity planning techniques described below can be used to analyze the need to construct a road to mitigate congestion hotspots, compute the right amount of capacity needed for each road segment, and to infer the projected effect on the overall performance of the road system. Similarly, the routing techniques described below can be used to suggest drivers alternative paths to their destination that would yield higher throughput or, equivalently, lower their destination arrival time.

The problem of energy networks generally includes transporting energy from the locations where energy is generated to the locations where it is consumed. For instance, energy can be in the form of electricity carried via the electrical grid. Other examples include fluidic networks, which can carry crude oil, natural gas, water, etc., or biological networks that may carry water, nutrients, etc.

Biological networks, through evolution, may tend to organize themselves in optimized structures that maximize their performance (in terms of transporting nutrients) and/or minimize the transportation costs. For instance, a tree transports sap from the root to its branches and in both directions. The sap transported from the root to its branches and leaves is called xylem, which carries energy and nutrients found from the soil where the tree is planted. The sap transported from the leaves and branches to the root is called phloem, which carries also important nutrients obtained from the biochemical process of photosynthesis performed in the cells of the leaves. In both networks (upward and downward), it is likely that the network transporting the sap performs optimally in terms of minimizing the amount of energy required to transport a given amount of sap. Such optimized designs can be generated for other types of networks, using the bottleneck structures and perturbation propagation based thereon, as discussed below. Biological networks can themselves be optimized based on such analysis.

Certain contributions of this disclosure are as summarized below:

A new generalized bottleneck structure called gradient graph is studied in detail. One difference with the bottleneck structure introduced in the '718 application is that the gradient graph allows us to not only qualify the influences that flows and bottlenecks exert on each other, but also to quantify them. This leads to the development of a quantitative theory of bottleneck structures (QTBS), discussed below. (Section 2.2)

A novel, fast procedure to compute the gradient graph is developed. Various embodiments of this procedure/algorithm feature an asymptotic speed-up, allowing us to scale our methodology to large production networks (Section 2.2)

The concepts of link and flow gradient are introduced. These operators quantify the effects of infinitesimally small perturbations in a network, the core building blocks of QTBS. A new, fast method to efficiently compute the gradients by leveraging the bottleneck structure is also presented. (Section 2.3.)

Applications demonstrating the practical implications of QTBS are provided in the areas of routing, capacity planning, and flow control. In each of these applications, we show how QTBS can potentially alter some of the established conventional best practices. Some of our contributions regarding the application of QTBS are listed below:

In the routing application, we introduce a technique/algorithm to find maximal-throughput routes by anticipating the effects of the congestion control algorithm. While in traditional traffic engineering approaches the problems of routing and flow control are considered independently, we show how QTBS can help resolve them jointly, allowing operators to design routes that are efficient from a congestion control standpoint. (Section 3.1.)

In the capacity planning application, we use QTBS to optimize the bandwidth allocation between the spine and leaf links of a fat-tree (also known as folded-Clos). We demonstrate that, due to the effects of congestion control, the optimal design differs from the conventional full fat-tree configuration. (Section 3.2.)

In the flow control application, we show that QTBS can be used to precisely compute the rate reduction that a set of traffic shapers must impose on the network's low priority flows in order to achieve a quantifiable positive impact on the high-priority flows. (Section 3.3.) To demonstrate that networks behave according to QTBS, we carry out experiments for each application we consider using production TCP/IP code and the widely adopted BBR and Cubic congestion control algorithms. (Section 3.)

2 Theoretical Framework 2.1 Network Model

In their simplest form, networks are systems that can be modeled using two kinds of elements: links, which offer communication resources with a limited capacity; and flows, which make use of such communication resources. We formalize the definition of network as follows:

Definition 2.1 Network. We say that a tuple $\mathcal{N} = \rangle L, F, \{c_l, \forall l \in L\} \langle$ is a network if:

L is a set of links of the form $\{l_1, l_2, \ldots, l_{|L|}\}$,

F is a set of flows of the form $\{f_1, f_2, \ldots, f_{|F|}\}$, and $c_l$ is the capacity of link l, for all $l \in L$.

Each flow f traverses a subset of links $L_f \subset L$ and, similarly, each link l is traversed by a subset of flows $F_l \subset F$. We will also adopt the convenient notation $f = L_f$ and $l = F_l$. That is, a flow is the list of links that it traverses and a link is the list of flows that traverse it. Finally, each flow f transmits data at a rate $r_f$ and the capacity constraint $\Sigma_{\forall f \in l} r_f \leq c_l$ must hold for all $l \in L$.

A core concept upon which our framework resides is the notion of a bottleneck link. Intuitively, a link in a network is a bottleneck if its capacity is fully utilized. Mathematically and in the context of this work, we will use a more subtle definition:

Definition 2.2 Bottleneck link. Let $N = \langle L, F, \{c_l, \forall l \in L\} \rangle$ be a network where each flow $f \in F$ transmits data at a rate $r_f$ determined by a congestion control algorithm (e.g., TCP's algorithm). We say that flow f is bottlenecked at link l—equivalently, that link l is a bottleneck to flow f—if and only if:
Flow f traverses link l, and $$\frac{\partial r_f}{\partial c_l^-} \neq 0.$$

That is, the transmission rate of flow f changes upon small changes of link l's capacity. We use the notation $$\frac{\partial r_f}{\partial c_l^-}$$

to denote the left derivative. This subtlety is necessary because a flow can have multiple bottleneck links. In this case, decreasing the capacity of only one bottleneck would affect the rate of the flow, while increasing its capacity would not; thus, the (two-sided) derivative would not exist.

This definition of bottleneck generalizes some of the classic definitions found in the literature, while differing from them in that it focuses on the notion of perturbation, mathematically expressed as a derivative of a flow rate with respect to the capacity of a link, $$\frac{\partial r_f}{\partial c_l}.$$

(As an example to illustrate our definition of bottleneck is relatively flexible, in Section 7.1 we show that it corresponds to a generalization of the classic max-min definition.) The general character of the bottleneck definition used in various embodiments described herein is relevant in that it makes our framework applicable not just to specific rate allocation assignments (e.g., max-min, proportional fairness, etc.) or to specific congestion control algorithms (e.g., BBR, Cubic, Reno, etc.), but to any class of congestion control solutions, such as those available in today's networks and those may be developed subsequently, provided that the two conditions in Definition 2.2 hold.

We complete the description of the network model introducing the concept of fair share:

Definition 2.3 Fair share of a link. Let $N = \langle L, F, \{c_l, \forall l \in L\} \rangle$ be a network. The fair share $s_l$ of a link $l \in L$ is defined as the rate of the flows that are bottlenecked at such link.

The flows bottlenecked at a link may all have the same rate that may be the same as the faire share of the link. As used throughout the discussion below, the concept of link fair share is dual to the concept of flow rate. That is, all the mathematical properties that are applicable to the rate of a flow, are also applicable to the fair share of a link.

2.2 The Gradient Graph

Our objective is to derive a mathematical framework capable of quantifying the effects that perturbations on links and flows exert on each other. Because the bottleneck structure described in U.S. patent application Ser. No. 14/580,718 considers only the effects between bottleneck links, we need a generalization of such structure that can also describe the effects of perturbations on flows. We refer to this data structure as the gradient graph, formally defined as follows (the name of this graph derives from the fact that perturbations can mathematically be expressed as derivatives or, more generically, as gradients):

Definition 2.4A Gradient graph. The gradient graph is a digraph such that:
1. For every bottleneck link and for every flow, there exists a vertex.
2. For every flow f:
   (a) If f is bottlenecked at link l, then there exists a directed edge from l to f;
   (b) If f is not bottlenecked at link l but it traverses it, then there exists a directed edge from f to l.

We may also employ a variation of the Definition 2.4A as:
Definition 2.4B Gradient graph. The gradient graph is a digraph such that:
1. For every bottleneck link and for every flow, there exists a vertex.
2. For every flow f:
   (a) If f is bottlenecked at link l, then there exists a directed edge from l to f;
   (b) If f traverses link l, then there exists a directed edge from f to l.

By way of notation, in the discussion below we will use the terms gradient graph and bottleneck structure indistinguishably. Intuitively, a gradient graph describes how perturbations on links and flows propagate through a network as follows. A directed edge from a link l to a flow f indicates that flow f is bottlenecked at link l (Condition 2(a) in Definitions 2.4A and 2.4B). A directed edge from a flow f to a link l indicates that flow f traverses but is not bottlenecked at link l (Condition 2(b) in Definition 2.4A), and a bidirectional edge from a flow f to a link l indicates that flow f traverses (and is bottlenecked at) link l (Condition 2(b) in Definition 2.4B).

From Definition 2.2, this necessarily implies that a perturbation in the capacity of link l will cause a change on the transmission rate of flow f, $$\frac{\partial r_f}{\partial c_l} \neq 0.$$

A change in the value of $r_f$, in turn, creates a perturbation that propagates to all the other links traversed by flow f, following the direction of those edges departing from flow f and arriving at such links (Conditions 2(b) in Definitions 2.4A or 2.4B). This basic process of (1) inducing a perturbation in a vertex in a graph (either in a link or a flow vertex) followed by (2) propagations in the departing edges of the vertex, creates a ripple effect in the bottleneck structure, terminating at the leaves of the gradient graph.

The utility of our definition of gradient graph as a data structure for understanding network performance is captured in the following theorem.

Theorem 2.5 Propagation of Network Perturbations.
Let $x, y \in L \cup F$ be a pair of links or flows in the network. Then a perturbation in the capacity $c_x$ (for $x \in L$) or transmission rate $r_x$ (for $x \in F$) of x will affect the fair share $s_y$ (for $y \in L$) or transmission rate $r_y$ (for $y \in F$) of y if only if there exists a directed path from x to y in the gradient graph.

1. The following characterizes the propagation of a perturbation in a bottleneck link:
    (a) A perturbation in a link l induced by a change on its capacity $c_l$ will propagate to another link l' affecting its fair share $s_{l'}$ if and only if l' is a descendant of l in the gradient graph.
    (b) A perturbation in a link l induced by a change on its capacity $c_l$ will propagate to a flow f affecting its transmission rate $r_f$ if and only if f is a descendant of l in the gradient graph.
2. Let f be a flow bottlenecked at link l. The following characterizes the propagation of a perturbation in a flow:
    (a) A perturbation in f induced by a change on its transmission rate $r_f$ will propagate to a link l' affecting its fair share $s_{l'}$, if and only if l' is a descendant of l in the gradient graph.
    (b) A perturbation in f induced by a change on its transmission rate $r_f$ will propagate to a flow f' affecting its transmission rate $r_{f'}$ if and only if f' is a descendant of l in the gradient graph.

Intuitively, the gradient graph of a network describes how perturbations in link capacities and flow transmission rates propagate through the network. Imagine that flow f is bottlenecked at link l. From Definition 2.2, this necessarily implies that a perturbation in the capacity of link l will cause a change on the transmission rate of flow f, $$\frac{\partial r_f}{\partial c_l} \neq 0.$$

This is reflected in the gradient graph by the presence of a directed edge from a link l to a flow f (Condition 2a in Definitions 2.4A and 2.5B). A change in the value of $r_f$, in turn, affects all the other links traversed by flow f. This is reflected by the directed edges from f to the links it traverses (e.g., Condition 2b in Definition 2.4B). This basic process of (1) inducing a perturbation in a vertex (either in a link or a flow vertex) followed by (2) propagating the effects of the perturbation along the departing edges of the vertex creates a ripple effect in the bottleneck structure as described in Theorem 2.5. Leveraging Theorem 2.5, we are now in a position to formally define the regions of influence of a data network.

Definition 2.6 Regions of influence in a data network. We define the region of influence of a link or flow x, denoted as R(x), as the set of links and flows y that are reachable from x in the gradient graph.

In the case of the region of influence of a link l, the other links and flows are affected by a perturbation in the capacity $c_l$ of link l, according to Theorem 2.5. Similarly, in the case of the region of influence of a flow f, the set of links and other flows are affected by a perturbation in the transmission rate $r_f$ of flow f, according to Theorem 2.5.

From Theorem 2.5, we know that the region of influence of a link (or a flow) corresponds to its descendants in the gradient graph. The region of influence is an important concept in network performance analysis and optimization because it describes what parts of a network are affected by perturbations in the performance of a link or a flow. In Section 2.3, it is discussed how such influences can be quantified using the concept of link and flow gradient.

We now introduce the GradientGraph (Algorithm 1A, FIG. 1A), an embodiment of a procedure that computes the gradient graph of a network. The algorithm works as follows. In line 4, a fair share (Definition 2.3) estimate of each link is computed. Lines 5 and 6 select all links that currently have the smallest fair share among those links with which they share a flow. For each of these links: (1) all the flows remaining in the network that traverse them are assigned the fair share of the link (line 7), removed from the network (line 10) and put into the set of flows that have converged to their theoretical transmission rate $C^k$ (line 11); (2) the link itself is also removed (line 10); and (3) directed edges are added to the gradient graph that go from the link to all the flows bottlenecked at it (line 8) and from each of these flows to the rest of the links that they traverse (line 9). This iterative process is repeated until all flows have converged to their theoretical rate (line 3). The algorithm returns the gradient graph g, the fair share of each link $\{s_l, \forall l \in L\}$ and the rate of each flow $\{r_f, \forall f \in F\}$.

Lemma 2.7A states the time complexity of the GradientGraph algorithm:

Lemma 2.7A Time complexity of the GradientGraph algorithm. The time complexity of running GradientGraph( ) is $O(H \cdot |L|^2 + |L| \cdot |F|)$, where H is the maximum number of links traversed by any flow.

FIG. 1B shows another embodiment of GradientGraph (Algorithm 1B). In this embodiment, the algorithm begins with crude estimates of the fair share rates of the links, and iteratively refines them until all the capacity in the network has been allocated and the rate of each flow reaches its final value. In the process, the gradient graph is constructed level by level. The algorithm starts by initializing the available capacity of each link (line 3), estimating its fair share (line 4) and adding all links to a min-heap by taking their fair share value as the key (line 5). At each iteration, the algorithm picks the unresolved link with the lowest fair share value from the min-heap (line 8).

Once this link is selected, all unresolved flows remaining in the network that traverse it are resolved. That is, their rates are set to the fair share of the link (line 12) and they are added to the set of vertices of the gradient graph V (line 13). In addition, directed edges are added in the gradient graph between the link and all the flows bottlenecked at it (line 10) and from each of these flows to the other links that they traverse (line 15). Lines 16-17-18 update the available capacity of the link, its fair share, and the position of the link in the min-heap according to the new fair share. Finally, the link itself is also added as a vertex in the gradient graph (line 22). This iterative process may be repeated until all flows have been added as vertices in the gradient graph (line 7). The algorithm returns the gradient graph G, the fair share of each link $\{s_l, \forall l \in L\}$ and the rate of each flow $\{r_f, \forall f \in F\}$.

Lemma 2.7B provides the run-time complexity of this embodiment of the GradientGraph( ) algorithm:

Lemma 2.7B. Time complexity of GradientGraph( ) The time complexity of running GradientGraph( ) is $O(|L| \log |L| \cdot H)$, where H is the maximum number of flows that traverse a single link.

The GradientGraph is memory efficient, as well. In particular, various embodiments of the GradientGraph include a respective vertex for each link and a respective vertex for each flow. As such, the number of vertices in a GradientGraph is $O(|L|+|F|)$. The edges in the graph from a link vertex to one or more flow vertices do not include, however, an edge to each and every flow vertex where that flow vertex represents a flow traversing the link corresponding to the link vertex. Rather, edges exist from a link vertex to a flow vertex only if, as described above, a flow corresponding to that flow vertex is bottlenecked at the link corresponding to the link vertex. This minimizes the total number of edges in various embodiments and implementations of Gradient-Graph.

Since the memory required to construct a GradientGraph is a function of (e.g., proportional to the total number of vertices and the total number of edges, the identification of the bottleneck structure facilitates efficient memory allocation in various embodiments. Specifically, in some cases, the memory to be allocated can be a function of the total number of link vertices to flow vertices edges, denoted ($|E_b^{l \to f}|$) where $|E_b^{l \to f}|$ is a sum of the number of bottlenecked flows at each link. The required memory may be proportional to $O(|L|+|F|+|E|)$, where the set $\{E\}$ includes the set of edges from flow vertices to link vertices, denoted $\{E^{f \to l}\}$ and the set of edges from link vertices to flow vertices corresponding to bottlenecked flows, denoted $\{E^{l \to f}\}$. In some cases, the total number of flows bottlenecked at a link l is less than the total number of flows traversing the link l, minimizing the number of edges $|E^{l \to f}|$.

Since, for one or more links, all flows traversing such links may not be bottlenecked at those respective links, the total number of link-to-flow edges (or the total number of bidirectional link-to-flow edges) that are required may be minimized compared to a network graph structure having, for each link, and edge from a corresponding link vertex to vertices corresponding to all flows traversing the link. This can facilitate a memory efficient storage of the gradient graph. Thus, the derivation of the bottleneck structure can minimize the memory required to store and manipulate such a structure, in various embodiments.

2.3 Link and Flow Gradients

In this section, we focus on the problem of quantifying the ripple effects created by perturbations in a network. Because networks include links and flows, generally there are two possible causes of perturbations: (1) those originating from changes in the capacity of a link and (2) those originating from changes in the rate of a flow. When such changes occur, the congestion control algorithm typically adjusts its allocation of bandwidth to the flows so as to maintain two objectives: (1) maximizing network utilization while (2) ensuring fairness among competing flows. The congestion control algorithm acts like a function mapping network conditions (including its topology, link capacities, and flow paths) to rate allocations. Large changes in any of these inputs can have complicated ripple effects on the flow rates, but for sufficiently small changes, the bandwidth allocation function is linear. Technically, it is piecewise linear, like the absolute value function, so picking a linear function that locally approximates it requires knowing the direction of the change. This local linearity property is used to form the concept of link and flow gradients:

Definition 2.8 Link and flow gradients. Let $N = \rangle L, F, \{c_l, \forall l \in L\} \langle$ be a network. We define:

The gradient of a link $l^* \in L$ with respect to some other link $l \in L$, denoted with $$\nabla_{l^*}(l), \text{ as } \nabla_{l^*}(l) = \frac{\partial s_l}{\partial c_{l^*}}.$$

The gradient of a link $l^* \in L$ with respect to some flow $f \in F$, denoted with $\nabla_{l^*}(f)$, $$\text{as } \nabla_{l^*}(f) = \frac{\partial r_f}{\partial c_{l^*}}.$$

The gradient of a flow $f^* \in F$ with respect to some link $l \in L$, denoted with $\nabla_{f^*}(l)$, $$\text{as } \nabla_{f^*}(l) = \frac{\partial s_l}{\partial r_{f^*}}.$$

The gradient of a flow $f^* \in F$ with respect to some other flow $f \in F$, denoted with $$\nabla_{f^*}(f), \text{ as } \nabla_{f^*}(f) = \frac{\partial r_f}{\partial r_{f^*}}.$$

Intuitively, the gradient of a link measures the impact that a fluctuation on the capacity of a link has on other links or flows. In real networks, this corresponds to the scenario of physically upgrading a link or, in programmable networks, logically modifying the capacity of a virtual link. Thus, link gradients can generally be used to resolve network design and capacity planning problems. Similarly, the gradient of a flow measures the impact that a fluctuation on its rate has on a link or another flow. For instance, this scenario corresponds to the case of traffic shaping a flow to alter its transmission rate or changing the route of a flow—which can be seen as dropping the rate of that flow down to zero and adding a new flow on a different path. Thus, flow gradients can generally be used to resolve traffic engineering problems. (In Section 3 applications in real networks that illustrate each of these scenarios are provided.)

Before describing how link and flow gradients can be efficiently computed using the gradient graph, we introduce the concept of flow drift:

Definition 2.9 Drift. Let $N = \rangle L, F, \{c_l, \forall l \in L\} \langle$ be a network and assume $\rangle g, \{s_l, \forall l \in L\}, \{r_f, \forall f \in F\} \langle$ is the output of GradientGraph(N) (Algorithms 1A or 1B). Let $\delta$ be an infinitesimally small perturbation performed on the capacity of a link $l^* \in L$ (equivalently, on the rate of a flow $f^* \in F$). Let also $s_l + \Delta_l$ and $r_f + \Delta_f$ be the fair share of any link $l \in L$ and the rate of any flow $f \in F$, respectively, after the perturbation $\delta$ has propagated through the network. We will call $\Delta_l$ and $\Delta_f$ the drift of a link l and a flow f, respectively, associated with perturbation $\delta$.

Intuitively, the drift corresponds to the change of performance experienced by a link or a flow when another link or flow is perturbed. With reference to FIG. 2, we now present an algorithm called ForwardGrad( ) (Algorithm 2) for calculating link and flow gradients. The algorithm takes a set of links and flows, the gradient graph of the corresponding network, a link or flow x with respect to which to compute the gradients, and a direction $\Delta x$ of the perturbation. It outputs the gradients of all links and flows in the network with respect to x. ForwardGrad( ) is related to forward mode automatic differentiation ("Forward Prop"), an algorithm that uses directed acyclic graphs to represent complicated mathematical functions as compositions of simpler functions, whose derivatives can be composed by repeatedly applying the chain rule. In the case of congestion control, we do not have a closed-form mathematical formula that relates network conditions (the inputs) to the flow rates and fair share values (the outputs) and, as such, Forward Prop cannot be used in this context. But we can use the gradient graph to break down and optimize this function.

The thrust of the algorithm is as follows. For all $l \in L$, let $\Delta_l$ be the change in the fair share rate of link l. For all $f \in F$, let $\Delta_f$ be the change in the rate of flow f. We call these variables the "drifts" caused by a perturbation. Before the perturbation, $\Delta_l = \Delta_f = 0$ for all links and flows. To begin the algorithm, we make an infinitesimally small perturbation in the independent variable (the one in the "denominator" of the derivative) that can be positive or negative. If the independent variable x is a flow f, we set $\Delta_f = \delta$ (line 2). If it is a link l, and $S_l$ is the set of direct successors of node l in the gradient graph, we set $\Delta_l = \delta S_l$ (line 3). This is done since, by definition of the gradient graph, $S_l$ is the number of flows bottlenecked at l and the change in l's capacity will be distributed evenly among these flows. To determine how this perturbation propagates to the rest of the network, we follow all directed paths from that vertex and update the drifts according to the following two invariants:

Gradient graph invariants. Let $N = \rangle L, F, \{c_l, \forall l \in L\} \langle$ be a network and let g be its gradient graph. Let $\delta$ be an infinitesimally small perturbation performed on the capacity of a link $l^* \in L$ (equivalently, on the rate of a flow $f^* \in F$) and let $\Delta_l$ and $\Delta_f$ be the drifts caused on a link $l \in L$ and a flow $f \in F$, respectively, by such a perturbation. Assume also that the perturbation propagates according to the gradient graph g by starting on the link vertex $l^*$ (equivalently, on the flow vertex $f^*$) and following all possible directed paths that depart from it, while maintaining the following invariants at each traversed vertex:

Invariant 1: Flow Equation. A flow's drift $\Delta_f$ equals the minimum drift of its bottleneck links. That is, $\Delta_f =$ $$\Delta_f = \min_{l \in P_f} \Delta_l,$$

where $P_f$ is the set of links visited directly before flow vertex f on a path from the starting vertex x (the predecessors in the graph).

Invariant 2: Link Equation. A link's drift $\Delta_l$ is the negative of the flow drifts entering its vertex, divided by the number of flow drifts leaving it. That is, $\Delta_l = -\Sigma_{f \in P_l} \Delta_f / |S_l|$, where $P_l$ is the set of flow vertices visited directly before link vertex l and $S_l$ is the set of flow vertices visited directly after link vertex l on a path from the starting vertex x.

Finally, the derivative of a given variable with respect to the independent variable that we perturbed can be calculated by dividing its drift by $\delta$. In particular, assume the capacity of link l is the independent variable that we perturbed and let the rate of flow f be the dependent variable in which we want to measure the effect of this perturbation. Then, $\partial r_f / \partial c_l = \Delta_f / \delta$.

Since the flow and link equations lie at the heart of the algorithm, we provide some further explanation. Invariant 1 ensures that the capacity limits are respected and the network's resources are not wasted. Each flow must use exactly the amount of bandwidth allocated by its bottleneck link, so if the bottleneck's fair share changes, the flow's rate must change too. It also ensures fairness, since each flow bottlenecked at a certain link will experience the same drift. Invariant 2 ensures that capacity is neither created nor destroyed through the process of propagating a perturbation, except at the link whose capacity was initially perturbed. If a link's predecessors are using less bandwidth than before, then the savings must be redistributed evenly among the other flows that traverse the link.

Let also g' be the gradient graph of the resulting network after the perturbation has propagated. Then, if g=g', the link and flow gradients can be computed as follows:

$$\nabla_{l^*}(l) = \frac{\partial s_l}{\partial c_{l^*}} = \frac{\Delta_l}{\delta}; \nabla_{l^*}(f) = \frac{\partial r_f}{\partial c_{l^*}} = \frac{\Delta_f}{\delta};$$

$$\nabla_{f^*}(l) = \frac{\partial s_l}{\partial r_{f^*}} = \frac{\Delta_l}{\delta}; \nabla_{f^*}(f) = \frac{\partial r_f}{\partial r_{f^*}} = \frac{\Delta_f}{\delta}.$$

This states that if the gradient graph does not change its structure upon a small perturbation (i.e., g=g') and the two invariants are preserved, then such a perturbation can be measured directly from the graph. The first invariant is a capacity feasibility constraint, ensuring that a flow's drift is limited by its most constrained bottleneck. The second invariant ensures that (1) the sum of the drifts arriving to and departing from a link vertex are equal to zero and (2) the drifts departing from a link vertex are equally distributed. Intuitively, this is needed to preserve the congestion control algorithm's objective to maximize network utilization while ensuring fairness among all flows.

FIGS. 3A and 3B show a graphical interpretation of the link and flow equations. FIG. 3C illustrates a simple example to compute the link gradient $\nabla_{l_1}(f_2)$. A perturbation is applied to link $l_1$ that decreases its capacity $c_{l_1}$ by an infinitesimally small amount $\delta$. such a perturbation propagates to flow $f_1$ according to the flow equation ($\Delta_f = \min\{\Delta_{l_i}, 1 \leq i \leq m\}$), resulting in a drift $\Delta_{f_1} = -\delta$. The perturbation is further propagated down to link $l_3$. Applying the link equation $$\left(\Delta_l = -\frac{\sum_{1 \leq i \leq m} \Delta_{f_i}}{n}\right),$$

this generates a drift on this link of $$\Delta_{l_3} = \frac{\delta}{2}.$$

Applying again the flow equation on $f_2$, we obtain the flow drift $$\Delta_{f_2} = \frac{\delta}{2}.$$

Thus, the gradient of link $l_1$ with respect to flow $f_2$ is $$\nabla_{l_1}(f_2) = \frac{\Delta_{f_2}}{\delta} = \frac{1}{2}.$$

FIG. 3D illustrates a simple example of flow gradient computation which shows that for this bottleneck structure, the gradient of flow $f_1$ with respect to flow $f_4$ is $\nabla_{f_1}(f_4) = -2$.

It should be noted that it is feasible for a link or flow gradient to have a value larger than 1. Such gradients are of interest because they mean that an initial perturbation of one unit at some location of a network, generates a perturbation at another location of more than one unit. For instance, a gradient of the form $\nabla_{f^*}(f) > 1$ implies that reducing the rate of flow f* by one unit creates a perturbation that results in an increase on the rate of flow f by more than one unit, thus creating a multiplicative effect. Such gradients can be used to identify arbitrage situations—e.g., configurations of the network that increase the total flow of a network. Because of their relevance, we will use the term power gradient to refer to such effect:

Definition 2.10 Power gradient. Let $N = \rangle L, F, \{c_l, \forall l \in L\} \langle$ be a network and let $\delta$ be an infinitesimally small perturbation performed on a flow or link $x \in L \cup F$, producing a drift $\Delta_y$, for all $y \in L \cup F$. If $\Delta_y > \delta$, equivalently $\nabla_x(y) > 1$, then we will say that $\nabla_x(y)$ is a power gradient. In Section 3, we provide examples of power gradients. For now, we conclude this section stating a property of boundedness that all gradients in congestion-controlled networks satisfy:

Property 1 Gradient bound. Let $N = \rangle L, T, \{c_l, \forall l \in L\} \langle$ be a network and let g be its gradient graph. Let $\delta$ be an infinitesimally small perturbation performed on a flow or link $x \in L \cup F$, producing a drift $\Delta_y$, for all $y \in L \cup F$. Then, $$\nabla_x(y) = \frac{\Delta_y}{\delta} \le d^{\frac{D(g)}{4}},$$

where D(X) is the diameter function of a graph X and d is the maximum indegree and outdegree of any vertex in the graph.

2.4 Leaps and Folds

The concepts of link and flow gradients introduced in the previous section provide a methodology to measure the effect of perturbations on a network that are small enough (infinitesimally small) to avoid a structural change in the gradient graph. In this section, we introduce the concepts of leap and fold, which allow us to generalize the framework to measure perturbations of arbitrary sizes. Two simple and intuitive examples of such kind of perturbations found in real networks include: a link failure, which corresponds to the case its capacity goes down to zero; or the re-routing of a flow, which corresponds to the case its rate goes down to zero and a new flow is initiated.

We know that if a perturbation in the network is significant enough to modify the structure of the gradient graph (i.e., $g \ne g'$), then the link and flow equations (FIGS. 3A and 3B) cannot be used to compute the gradients of such a perturbation. In this section, we present a technique that can be used to measure perturbations of arbitrary sizes by using the concepts of leap and fold:

Definition 2.11 Gradient leap. Let $\nabla_x(y)$ be a gradient resulting from an infinitesimally small perturbation $\delta$ on a link or flow x, where $x, y \in L \cup F$. Suppose that we intensify such a perturbation by a factor k, resulting in an actual perturbation of $\lambda = k \cdot \delta$, for some k>0. Further, assume that k is the largest possible value that keeps the structure of the gradient graph invariant upon perturbation $\lambda$. Then, we will say that $\lambda$ is the leap of gradient $\nabla_x(y)$.

The following lemma shows the existence of folds in the bottleneck structure when its corresponding network is reconfigured according to the direction indicated by a gradient and by an amount equal to its leap:

Lemma 2.12 Folding links. Let $N = \rangle L, F, \{c_l, \forall l \in L\} \langle$ be a network and let g be its gradient graph. Let $\lambda$ be the leap of a gradient $\nabla_x(y)$, for some $x, y \in L \cup F$. Then, there exist at least two links l and l' such that: (1) for some $f \in F$, there is a directed path in g of the form $l \to f \to l'$; and (2) $s_l = s_{l'}$ after the perturbation has propagated through the network.

Intuitively, the above lemma states that when a perturbation is large enough to change the structure of the gradient graph, such structural change involves two links l and l' directly connected via a flow f (i.e., forming a path $l \to f \to l'$) that have their fair shares collapse on each other ($s'_l = s'_{l'}$) after the perturbation has propagated. The faire shares can be substantially or approximately equal (e.g., the difference between the faire shares can be zero or less than a specified threshold, e.g., 10%, 5%, 2%, 1%, or even less of the fair share of one of the links.) Graphically, this corresponds to the folding of two consecutive levels in the bottleneck structure. We can now formalize the definition of fold as follows.

Definition 2.13 Fold of a gradient. Let $\lambda$ be the leap of a gradient $\nabla_x(y)$, for some $x, y \in L \cup F$, and let l and l' be two links that fold once the perturbation $\lambda$ has propagated through the network (note that from the discussion above, such links must exist). We will refer to the tuple (l, l') as a fold of gradient $\nabla_x(y)$.

FIG. 4 introduces Algorithm LeapFold( ), a procedure to compute the leap and the fold of a link or flow gradient. Intuitively, for each pair of link vertices l and l' in the bottleneck structure that are directly connected via a flow vertex (in line 4, l' is a link successor of l), we compute the maximum amount $\lambda$ that can be traveled along the gradient without the collision of the two links' fair share (line 5). The minimum value of $\lambda$ among all such pairs of links corresponds to the leap (line 7), while the links themselves constitute a fold (line 8). The algorithm returns both the leap and the fold (line 12).

The concept of leap and fold is relevant in that it enables a methodology to efficiently travel along the solution space defined by the bottleneck structure, towards reaching a certain performance objective is achieved. Specifically, for some $x, y \in L \cup F$, if x is perturbed negatively so as to benefit another flow or link in the network, but only up to the leap of x, i.e., $\lambda$, the negative and positive changes may be balanced. On the other hand, if x is perturbed negatively by more than its $\lambda$, the positive impact of this perturbation on another flow or link would not exceed $\lambda$, potentially resulting in degradation of the overall network performance.

We introduce a method/algorithm MinimizeFCT( ) shown in FIG. 5, that can identify a set of perturbations needed in a network to minimize the completion time of a given flow $f_s$ (also referred to as flow completion time (FCT)). The algorithm starts (line 2) by identifying a maximal gradient $\nabla_{f^*}(f_s)$. This corresponds to a direction in the solution space that improves the performance of $f_s$ maximally. Then, it travels along such gradient by an amount equal to its leap (lines 6 through 11). This is achieved by adding a logical link $l_k$ that acts as a traffic shaper reducing the rate of flow f* by the leap amount. This causes the intended perturbation, thus resulting in the increase of flow $f_s$'s rate by the amount leap$\times \nabla_{f^*}(f_s)$.

From the discussion above, we know that the additional traffic shaper changes the structure of the gradient graph, at which point we need to iterate again the procedure (line 1) to recompute the new values of the gradients based on the new structure. This process is repeated iteratively until either no more positive gradients are found or the performance of $f_s$ has increased above a given rate target $\rho$ (lines 3 and 4). In the next section, an example is presented demonstrating how embodiments of MinimizeFCT( ) may be used to optimize the performance of a time-bound constrained flow.

To provide the process illustrated using FIGS. 3A-3D into a precise algorithm, we still must specify the order in which to process the vertices of the graph. At each step, the vertex we process must be a neighbor of one of the vertices we have already visited. Even though backward edges create loops in the gradient graph, we never visit a vertex twice. If multiple vertices meet these criteria, we pick the one with the minimal rate or fair share value. If there are multiple vertices with the minimal rate or fair share value, we pick the one that would receive the minimum drift if it were processed next (see line 15, Algorithm 2, FIG. 2) where keys in the heap are ordered pairs of rate/fair share and drift). This reflects the order in which the bottleneck structures are constructed in Algorithm 1B, which reflects the order in which the rates and fair shares converge in congestion controlled networks. That is, we first visit the vertex that would receive the smallest rate or fair share if the perturbation were applied and bandwidth were reallocated from scratch. This completes the description of the Forward-Grad( ) algorithm.

The next two theorems show that Algorithm 2 is both correct and efficient.

Theorem 2.9. Correctness of ForwardGrad®. Let $\mathcal{N} = \langle \mathcal{L}, \mathcal{F}, \{c_l, \forall l \in L\} \rangle$ be a network and let g be the corresponding gradient graph. Let $x \in L \cup F$. After running Algorithm 2, $\Delta_{s_l} = \nabla_x(l)$ for all $l \in L$, and $\Delta r_f = \nabla_x(f)$, for all $f \in F$.

Theorem 2.10. Time complexity of ForwardGrad( ). Let $x \in L \cup F$. Then Algorithm 2 finds the gradients of all links and flows in the network with respect to x in time $O(|R(x)| \cdot \log(|R(x)|))$ To conclude and complement this section, we state an upper bound on the value of the gradients:

Property 2.11. Gradient bound. Let $\mathcal{N} = \langle \mathcal{L}, \mathcal{F}, \{c_l, \forall l \in L\} \rangle$ be a network and let g be its gradient graph. Let $\delta$ be an infinitesimally small perturbation performed on a flow or link $x \in L \cup F$, producing a drift $\Delta_y$, for all $y \in L \cup F$. Then, $$|\nabla_x(y)| = \frac{|\Delta_y|}{\delta} \leq d^{\frac{D(g)}{4}},$$

where D(X) is the diameter of a graph X and d is the maximum indegree and outdegree of any vertex in the graph.

3 Applications to Data Networks and Experimental Results

Because bottleneck structures are a fundamental property intrinsic to any congestion-controlled data network, its applications span a variety of networking problems. In this section, our goal is to present examples and experiments illustrating how QTBS can be used to resolve some of these problems. We will see that in each of them, the framework is able to provide new insights into one or more operational aspects of a network. The examples presented in this section are not exhaustive, but only illustrative. To help organize the applications, we divide them in two main classes: traffic engineering and capacity planning. For each of these classes, we provide specific examples of problems that relate to applications commonly found in modern production networks.

To experimentally demonstrate that data networks behave qualitatively and quantitatively according to QTBS, we use Mininet-Extensions-Anonymized, a network emulation framework developed by our team that consists of a set of software modules and extensions to Mininet. Leveraging software define networking (SDN), Mininet-Extensions-Anonymized enables the creation and analysis of arbitrary network architectures using real production TCP/IP code, including production-grade implementations of congestion control algorithms such as BBR, Cubic or Reno.

All the experimental results presented in this section are based on Google's BBR congestion control algorithm and Cubic. For each experiment, we used Jain's fairness index as an estimator to measure how closely the predictions of the theory of bottleneck structure model match the experimental results. For all BBR experiments presented in the next sections, this index was above 0.99 accuracy on a scale from 0 to 1, reflecting the strength of QTBS in modeling network behavior.

3.1 Traffic Engineering: Computation of the Highest-Throughput Route

In traditional IP networks, the problems of flow routing and congestion control are separately resolved by following a two-step process: first, a routing protocol (e.g., BGP, OSPF, etc.) is used to determine the path between any two nodes in a network; then, flows are routed according to such paths and their transmission rates are regulated using a congestion control algorithm (e.g., BBR). This layered and disjoint approach is known generally to be scalable but suboptimal because the routing algorithm identifies paths without taking into account the flow transmission rates assigned by the congestion control algorithm. In this section, we use QTBS to resolve the following joint routing and congestion control problem in a scalable manner.

Definition 3.1. Flow-rate maximal routing. Let $\mathcal{N} = \langle \mathcal{L}, T, \{c_l, \forall l \in \mathcal{L}\} \rangle$ be a network and suppose that a new flow f arrives. We will say that a routing algorithm is flow-rate maximal if it routes flow f through a path that maximizes its transmission rate $r_f$.

In traditional IP routing, all packets transmitted from a source to a destination node follow the same lowest-cost route. This rigidity leads to the well-known fish problem, whereby certain paths in a network become congested while other paths are underutilized. Various embodiments of the flow-rate maximal algorithm, instead, are able to bypass points of congestion by assigning new flows to the highest-throughput path available given the current usage of the network.

One might mistakenly think that the least congested path can be identified by looking for links with small fair shares (Definition 2.3). However, the placement of a new flow onto a given path will itself alter the state of the network, changing those fair shares and potentially rendering the chosen path sub-optimal. In this section, we show that QTBS can be used to identify the maximal-rate path for a flow while taking into account the perturbations created by the placement of the flow itself, thus solving the flow-rate maximal routing problem.

MaxRatePath( ) (Algorithm 3 shown in FIG. 6) is an algorithm that uses QTBS to compute flow-rate maximal paths. It takes the following inputs: a network $N = \langle L, F, \{c_l, \forall l \in L\} \rangle$, the set of routers U, and the source and destination routers of the flow we intend to route, $u_s$ and $u_d$. By convention, a link $l \in L$ is identified with the tuple $l = (u_x, u_y)$ where $u_x, u_y$ are the two routers connected by link l. The algorithm returns the new flow f, expressed as the set of links it traverses, guaranteeing they form a path from $u_s$ to $u_d$ that yields the maximal rate $r_f$ for f.

As the pseudocode shows, MaxRatePath( ) is based on Dijkstra's shortest path algorithm, with routers as vertices and links as edges in the network topology graph. The difference resides in the way the "distance" to a neighboring router u' is calculated (lines 12-14). In MaxRatePath( ) this value represents not the number of hops on the shortest path from $u_s$ to u', but the inverse of the largest possible rate that a flow would experience if it were added on some path from $u_s$ to u'. That is, the distance to u' is the smallest possible time needed to send 1 bit of information from $u_s$ to u'.

Unlike in the standard Dijkstra's algorithm, this value cannot be computed by adding an edge length to $d_u$, the distance to a neighbor of u'. Instead, we create a new flow f by extending the optimal path from $u_s$ to u. So, at each iteration of the algorithm, f takes the path $u_s \rightarrow \ldots \rightarrow u \rightarrow u'$ (line 12). We then construct the gradient graph that would correspond to this network if the new flow f were added (line 13). Finally, we use the inverse of the rate assigned to the new flow $r_f$ as the distance value (line 14). In the pseudocode, we invoke the GradientGraph( ) algorithm in line 13, reconstructing the gradient graph to include the new flow.

Lemma 3.2. Correctness of the MaxRatePath algorithm. Let $N = \rangle L, T, \{c_l, \forall l \in L\} \langle$ be a network and U the set of its routers. Suppose that f and f' are two flows not in F that originate at router $u_s$ and end at router $u_d$. Then f=MaxRatePath(N, U, $u_s$, $u_d$) implies $r_f \geq r_{f'}$.

Figure 7:
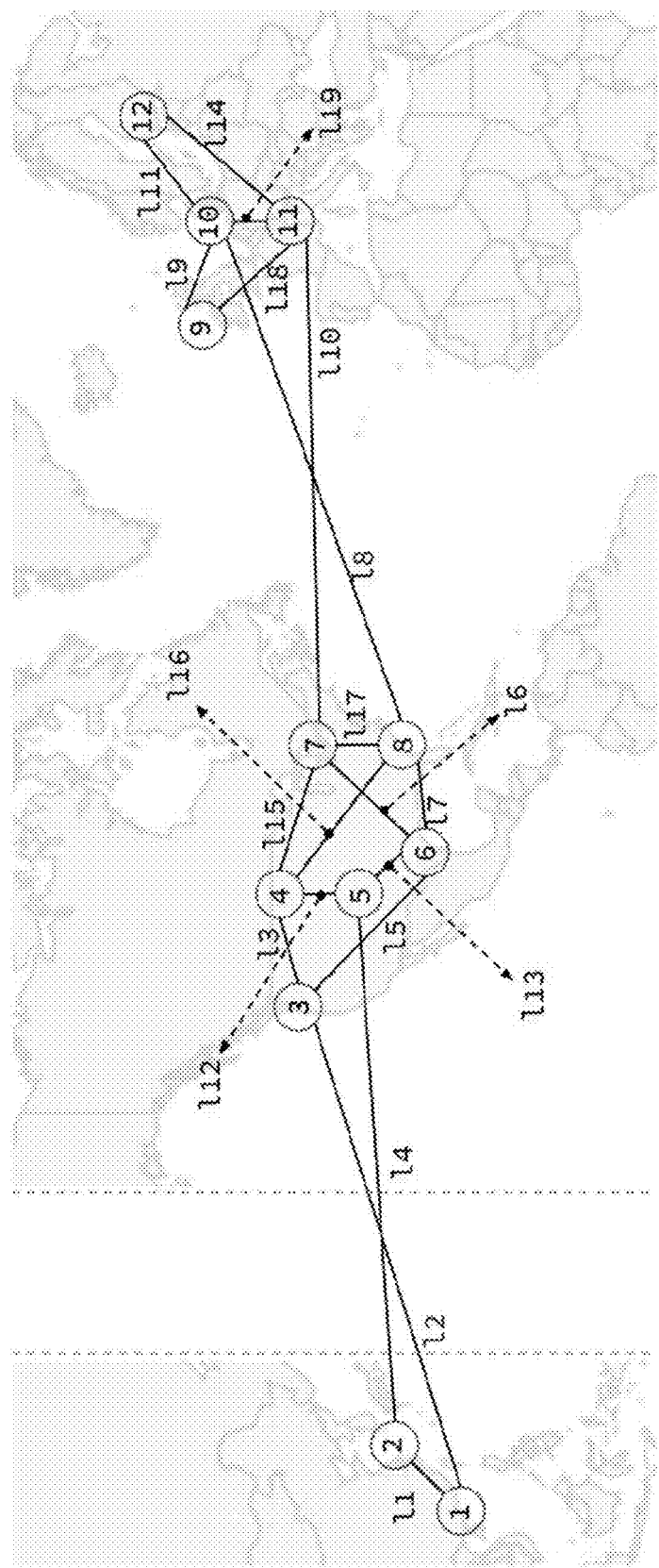
FIG. 7 depicts one topology of an example network.

To illustrate how we can use QTBS and the MaxRate-Path( ) algorithm to compute the highest-throughput path for a given flow, consider the network shown in FIG. 7. This topology corresponds to Google's B4 network, the SDN-WAN network that connects Google's data centers globally. For the sake of illustration, we will assume there are two flows (one for each direction) connecting every data center in the US with every data center in Europe, with all flows routed along a shortest path from source to destination. Since there are six data centers in the US and four in Europe, this configuration has a total of 48 flows (|F|=6×4×2). Table 1 shows the exact path followed by each flow. All links are assumed to have a capacity of 10 Gbps except for the transatlantic links, which are configured at 25 Gbps (i.e., $c_l$=10, for all $l \notin (l_8, l_{10})$, $c_{l_8} = c_{l_{10}} = 25$). While production networks operate with a much higher number of flows, in our example we use a reduced number to simplify the descriptions of the bottleneck structures and the steps followed to resolve the given problem. This simplification is without loss of generality, and the same approach is applicable to large scale operational networks.

Figure 8A:
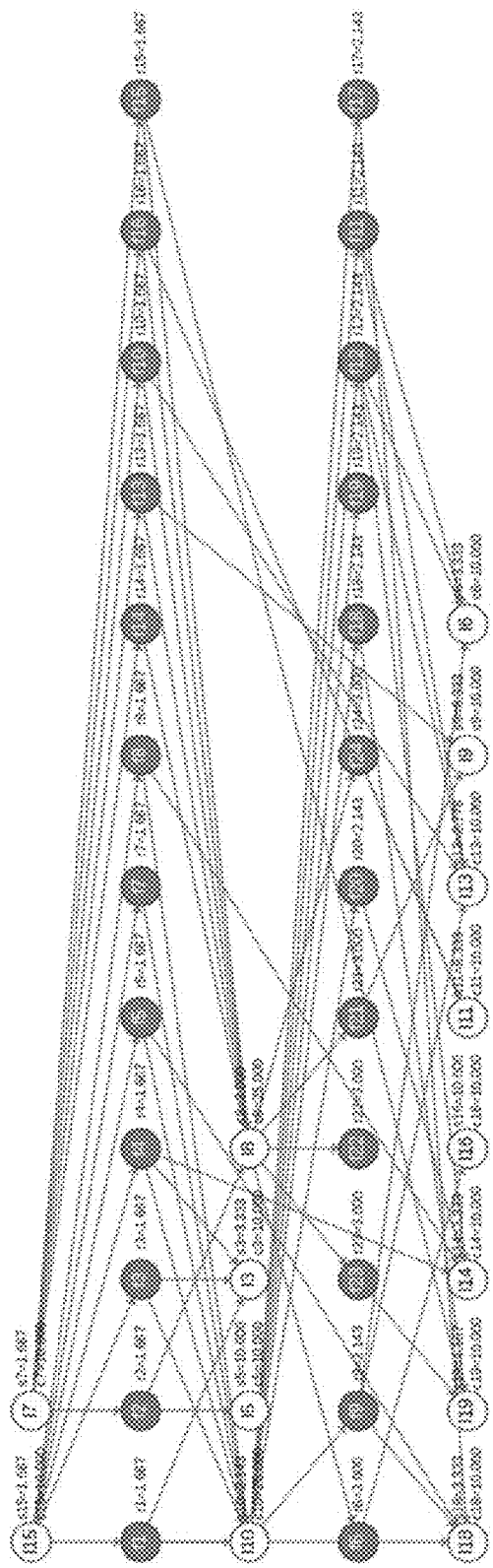
FIGS. 8A-8C show a sequence of gradient graphs and corresponding bottleneck structures generated using various embodiments of the procedure depicted in FIG. 6.

FIG. 8A shows the corresponding bottleneck structure obtained from running Algorithms 1A or 1B (FIGS. 1A-1B). This structure shows that flows are organized in two levels: the top-level includes flows $\{f_1, f_2, f_3, f_4, f_5, f_7, f_8, f_{10}, f_{13}, f_{14}, f_{15}, f_{16}\}$ and the low-level includes flows $\{f_6, f_9, f_{11}, f_{12}, f_{17}, f_{18}, f_{19}, f_{20}, f_{21}, f_{22}, f_{23}, f_{24}\}$. Note that because each pair of data centers is connected via two flows (one for each direction), without loss of generality, in FIG. 8A we only include the first 24 flows (flows transferring data from US to Europe), since the results are symmetric for rest of the flows—i.e., flow h has the same theoretical transmission rate and is positioned at the same level in the bottleneck structure as flow $f_{i+24}$, for all $1 \leq i \leq 24$.

Note also that all the top-level flows operate at a lower transmission rate (with all rates at 1.667) than the bottom-level flows (with rates between 2.143 and 3). This in general is a property of all bottleneck structures: flows operating at lower levels of the bottleneck structure have higher transmission rates than those operating at levels above. Under this configuration, suppose that we need to initiate a new flow $f_{25}$ to transfer a large data set from data center 4 to data center 11. For instance, this flow could correspond to the transmission of a terabyte data set from a data center in the US to another in Europe. Our objective in this exercise is to identify a high-throughput route to minimize the time required to transfer the data.

Figure 8B:
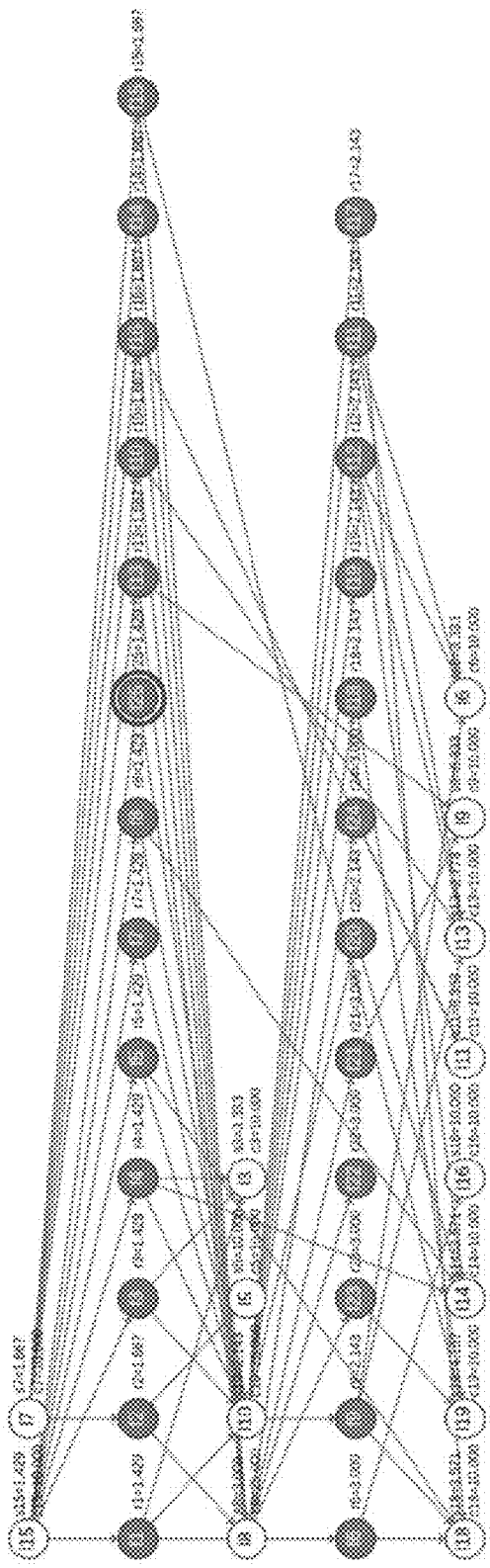

Because the bottleneck structure reveals the expected transmission rate of a flow based on the path it traverses, we can use QTBS to resolve this problem. In FIG. 8B we show the bottleneck structure obtained for the case that $f_{25}$ uses the shortest path $l_{15} \rightarrow l_{10}$. For instance, this corresponds to the solution obtained from running BGP with a link cost metric equal to 1. Using this path, the new flow would be placed at the upper bottleneck level—i.e., the lower-throughput level—in the bottleneck structure, receiving a theoretical rate of $r_{25}$=1.429.

Note that the presence of this new flow slightly modifies the performance of some of the flows on the first level (flows $\{f_1, f_3, f_4, f_5, f_7, f_8\}$ experience a rate reduction from 1.667 to 1.429), but it does not modify the performance of the flows operating at the bottom level. This is because, for the given configuration, the new flow only creates a shift in the distribution of bandwidth on the top level, but the total amount of bandwidth used in this level stays constant. (In FIG. 8A, the sum of all the flow rates on the top bottleneck level is 1.667×12=20, and in FIG. 8B this value is the same: 1.429×7+1.667×6=20.) As a result, the ripple effects pro-

TABLE 1

Path followed by each flow in the routing optimization experiments

| | Experiment 1: | | | | Experiment 2: | | |
|---|---|---|---|---|---|---|---|
| Flow | Links Traversed | Flow | Links Traversed | Flow | Links Traversed | Flow | Links Traversed |
| $f_1$ | $\{l_3, l_{15}, l_{10}, l_{18}\}$ | $f_{14}$ | $\{l_7, l_8\}$ | $f_1$ | $\{l_3, l_{15}, l_{10}, l_{18}\}$ | $f_{14}$ | $\{l_7, l_8\}$ |
| $f_2$ | $\{l_5, l_7, l_8\}$ | $f_{15}$ | $\{l_7, l_8, l_9\}$ | $f_2$ | $\{l_5, l_7, l_8\}$ | $f_{15}$ | $\{l_7, l_8, l_9\}$ |
| $f_3$ | $\{l_3, l_{15}, l_{10}\}$ | $f_{16}$ | $\{l_7, l_8, l_{11}\}$ | $f_3$ | $\{l_3, l_{15}, l_{10}\}$ | $f_{16}$ | $\{l_7, l_8, l_{11}\}$ |
| $f_4$ | $\{l_3, l_{15}, l_{10}, l_{14}\}$ | $f_{17}$ | $\{l_{10}, l_{18}\}$ | $f_4$ | $\{l_3, l_{15}, l_{10}, l_{14}\}$ | $f_{17}$ | $\{l_{10}, l_{19}\}$ |
| $f_5$ | $\{l_{15}, l_{10}, l_{18}\}$ | $f_{18}$ | $\{l_{10}, l_{19}\}$ | $f_5$ | $\{l_{15}, l_{10}, l_{18}\}$ | $f_{18}$ | $\{l_{10}, l_{19}\}$ |
| $f_6$ | $\{l_{16}, l_8\}$ | $f_{19}$ | $\{l_{10}\}$ | $f_6$ | $\{l_{16}, l_8\}$ | $f_{19}$ | $\{l_{10}\}$ |
| $f_7$ | $\{l_{15}, l_{10}\}$ | $f_{20}$ | $\{l_{10}, l_{14}\}$ | $f_7$ | $\{l_{15}, l_{10}\}$ | $f_{20}$ | $\{l_{10}, l_{14}\}$ |
| $f_8$ | $\{l_{15}, l_{10}, l_{14}\}$ | $f_{21}$ | $\{l_8, l_9\}$ | $f_8$ | $\{l_{15}, l_{10}, l_{14}\}$ | $f_{21}$ | $\{l_8, l_9\}$ |
| $f_9$ | $\{l_{13}, l_6, l_{10}, l_{18}\}$ | $f_{22}$ | $\{l_8\}$ | $f_9$ | $\{l_{13}, l_6, l_{10}, l_{18}\}$ | $f_{22}$ | $\{l_8\}$ |
| $f_{10}$ | $\{l_{13}, l_7, l_8\}$ | $f_{23}$ | $\{l_8, l_{19}\}$ | $f_{10}$ | $\{l_{13}, l_7, l_8\}$ | $f_{23}$ | $\{l_8, l_{19}\}$ |
| $f_{11}$ | $\{l_{13}, l_6, l_{10}\}$ | $f_{24}$ | $\{l_8, l_{11}\}$ | $f_{11}$ | $\{l_{13}, l_6, l_{10}\}$ | $f_{24}$ | $\{l_8, l_{11}\}$ |
| $f_{12}$ | $\{l_{13}, l_6, l_{10}, l_{14}\}$ | $f_{25}$ | $\{l_{15}, l_{10}\}$ | $f_{12}$ | $\{l_{13}, l_6, l_{10}, l_{14}\}$ | $f_{25}$ | $\{l_{16}, l_8, l_{19}, l_{20},\}$ |
| $f_{13}$ | $\{l_7, l_8, l_9\}$ | | | $f_{13}$ | $\{l_7, l_8, l_9\}$ | | | duced from adding flow $f_{25}$ into the network cancel each other out without propagating to the bottom level.

Figure 8C:
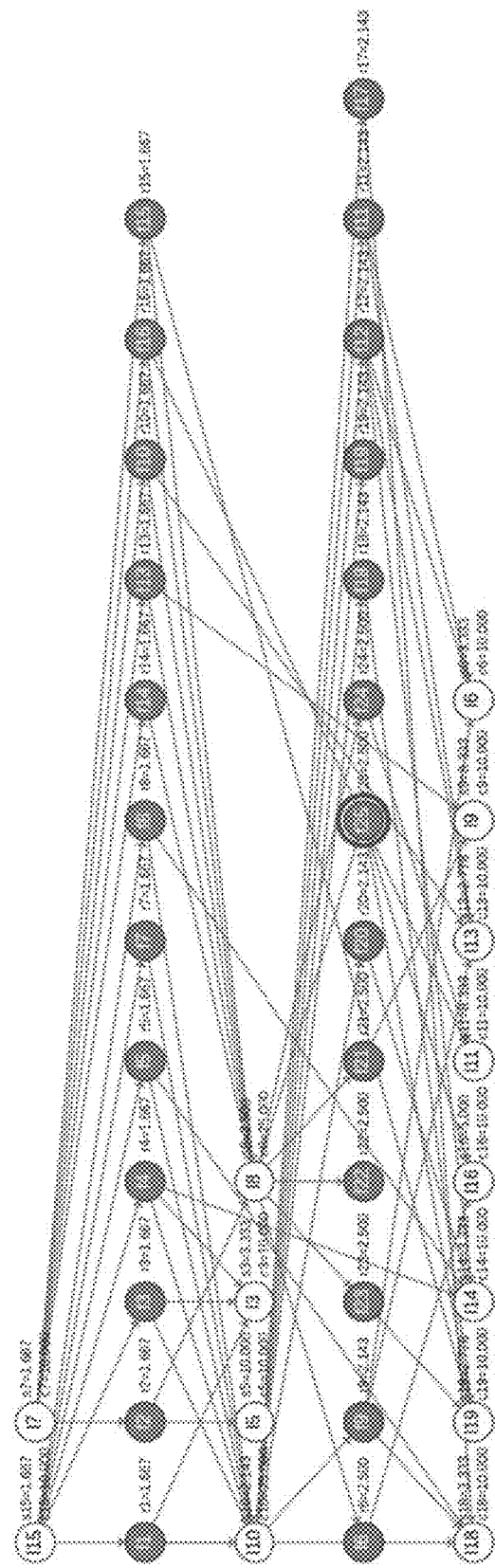

While $l_{15} \to l_{10}$ is the shortest path, it is not the path with the highest throughput. To find such a path, we run an embodiment of the MaxRatePath procedure (Algorithm 3) and obtain the solution $l_{16} \to l_8 \to l_{19}$. The resulting bottleneck structure is shown in FIG. 8C. Using this path, flow $f_{25}$ would now be placed at the bottom level—the higher-throughput level—in the bottleneck structure, thus resulting in a rate value $r_{25}$=2.5, an increase of 74.95% with respect to the shortest path solution. Another positive outcome of this solution is that none of the flows operating at the upper level (the flows that receive less bandwidth) sees its rate reduced. This is a direct consequence of Theorem 2.5, since a perturbation on lower levels can have no ripple effects on upper levels. This represents a natural fairness property of embodiments of the MaxRatePath algorithm: as the procedure assigns maximal-throughput paths to new incoming flows, such flows tend to be placed at the bottom of the bottleneck structure (where the high-throughput links are located), thus tending to create no negative impact on the lower-throughput flows located at the top of the structure.

In the remainder of this section, we set out to empirically confirm these results. We start by creating the B4 network configuration shown in FIG. 7 using Mininet-Extensions-Anonymized. Following our example, we deploy a total of 48 shortest-path flows connecting every pair of nodes (in both directions) between the US and Europe. We then add two extra flows labeled $f_{25}$ and $f_{50}$ (one for each direction) to connect data centers 4 and 11, and perform two separate experiments: one placing the flows on the shortest path $l_{15} \to l_{10}$ and another one placing them on the longer path $l_{16} \to l_{18} \, l_{19}$.

Figure 9A:
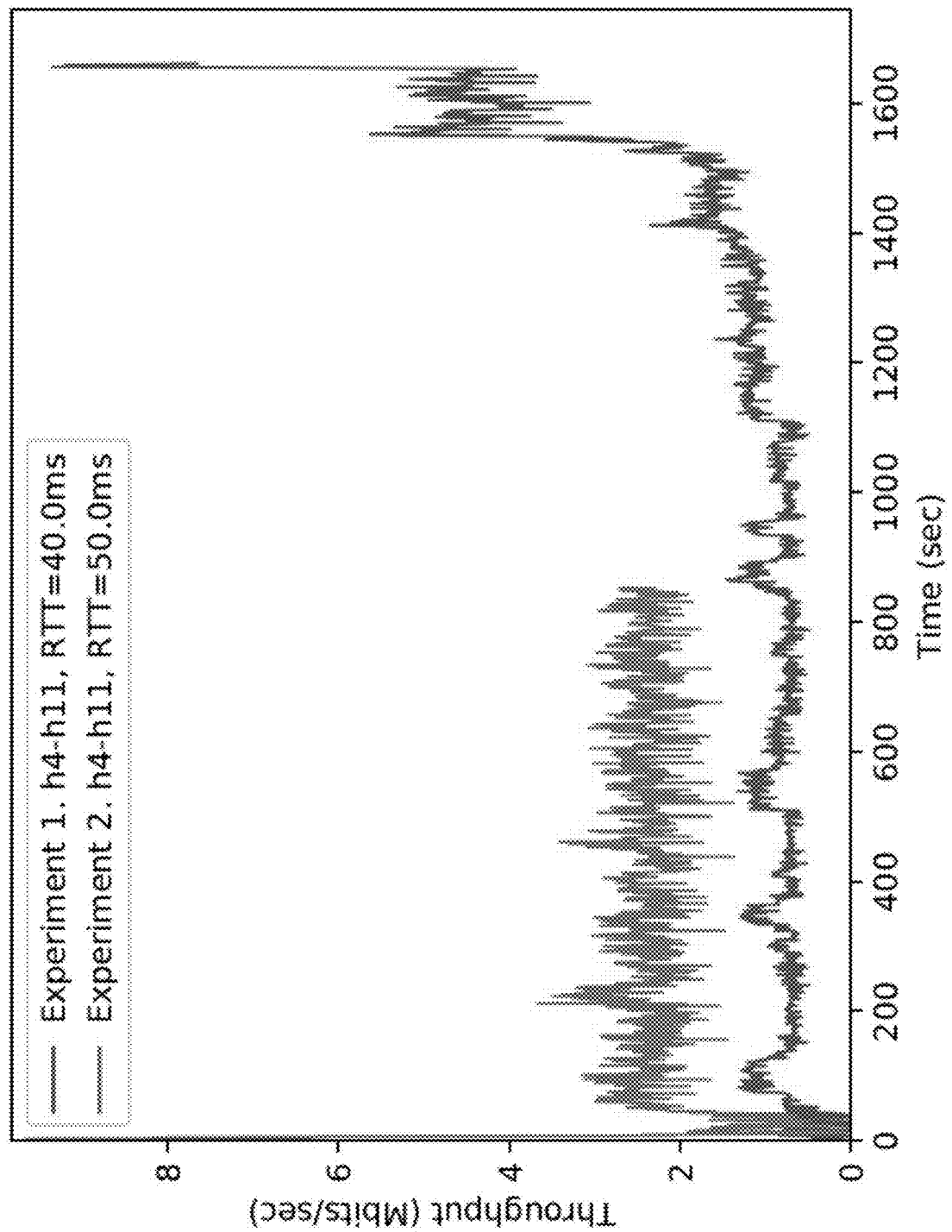
FIG. 9A shows the acceleration of the rate of a flow using two different techniques, one of which employs an embodiment of the procedure shown in FIG. 6.
Figure 9B:
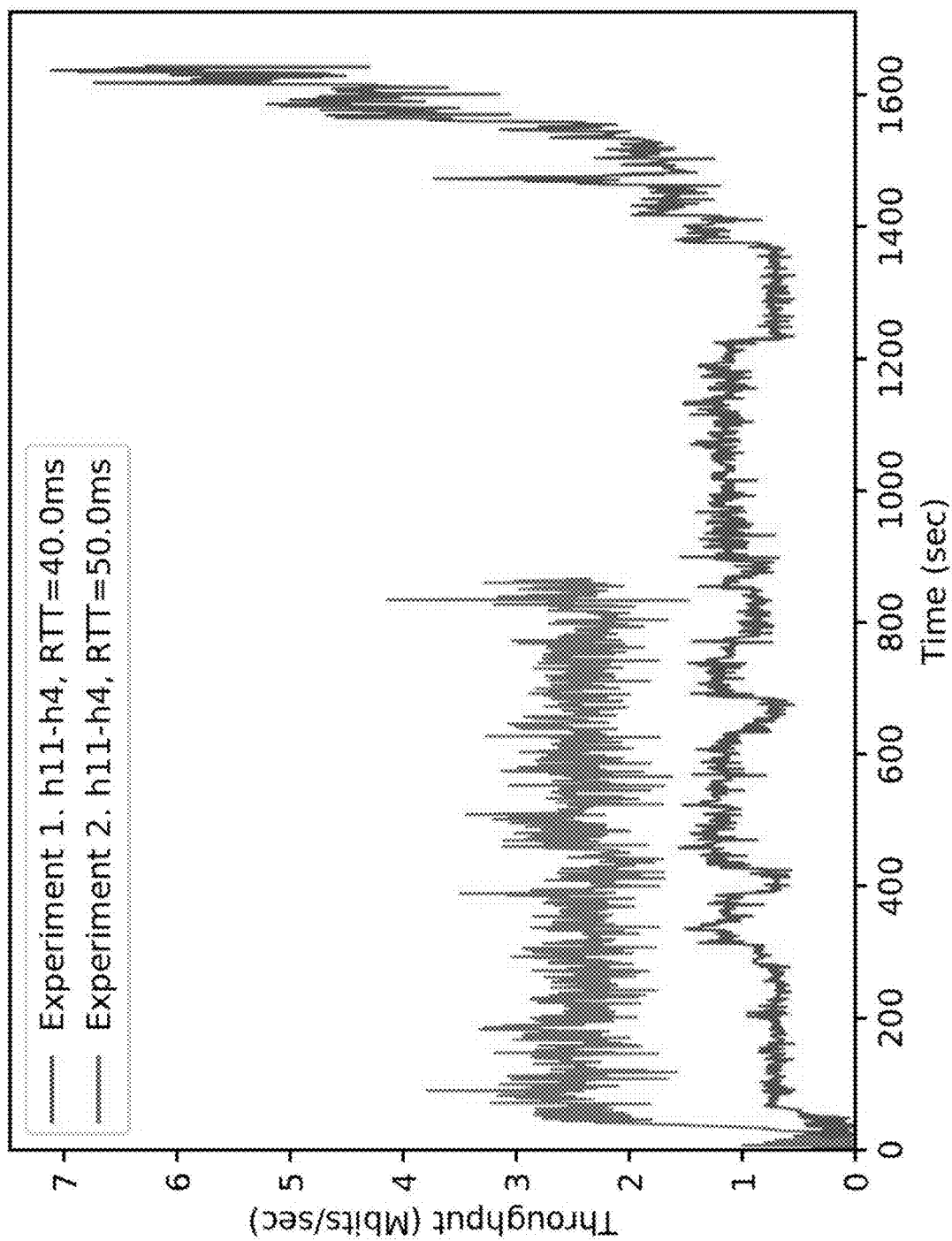
FIG. 9B shows the acceleration of the rate of another flow using two different techniques, one of which employs an embodiment of the procedure shown in FIG. 6.

FIGS. 9A and 9B show the respective rates of flows $f_{25}$ and $f_{50}$, for the two experiments. In the legend of this plot, experiment 1 and 2 correspond to the shortest and the (longer) maximal-throughput path configurations, respectively. As predicted by the bottleneck structure, the longer path achieves a higher throughput and, thus, a lower flow completion time. The Table in FIG. 9C presents the average throughput obtained for all twenty-five flows from the US to Europe and for each of the two experiments, alongside the theoretical values according to the bottleneck structure. The results obtained from the other twenty-five flows on the reverse path are similar. As shown, flow $f_{25}$ achieves a performance of 1.226 and 2.386 Mbps for the shortest and longer paths, respectively—with the theoretical rates being 1.428 and 2.5 Mbps, respectively. Thus, the longer path yields a 94% improvement on flow throughput compared to the shortest path. For all the experiments run in this section, Jain's fairness index was above 0.99, indicating the accuracy of QTBS in predicting flow performance.

This experiment illustrates that using QTBS, it is possible to identify routes that are highly efficient from a congestion control standpoint. Note that this contrasts with traditional approaches that perform traffic engineering by separating the routing and congestion control problems, so that the routing algorithm is unaware of the choices made by the congestion control algorithm and vice versa. We reason that QTBS provides a mathematical framework to connect both problems, identifying routes that are globally efficient from both a topological and a congestion control standpoints.

The above-described technique is not limited to adding new flows to a network. An existing flow may be rerouted using the technique described above. If an existing flow is to be rerouted, the existing flow may be terminated and removed from the network topology. A few flow may then be added between the source and destination of the removed flow, as discussed above.

3.2 Capacity Planning: Design of Optimal Fat-Tree Networks in Data Centers

Fat-trees are generally understood as universally efficient networks in the following sense: for a given network size s, a fat-tree can emulate any other network that can be laid out in that size s with a performance slowdown at most logarithmic in s. This property makes fat-tree topologies highly competitive and is one of the reasons they are so widely used in large-scale data centers and high-performance computing (HPC) networks. In the context of data centers, fat-tree networks are also known as folded-clos or spine-and-leaf networks. In this experiment, we use QTBS to demonstrate that, due to the effects of the congestion control algorithm, there exists an optimal trade-off in the allocation of capacity at the top levels of the fat-tree. Further, we show that the optimal bandwidth allocation on the top level deviates from commonly accepted best practices in the design of full fat-tree networks that tend to equate the amount of bandwidth going up and down the tree at each switch.

Figure 10:
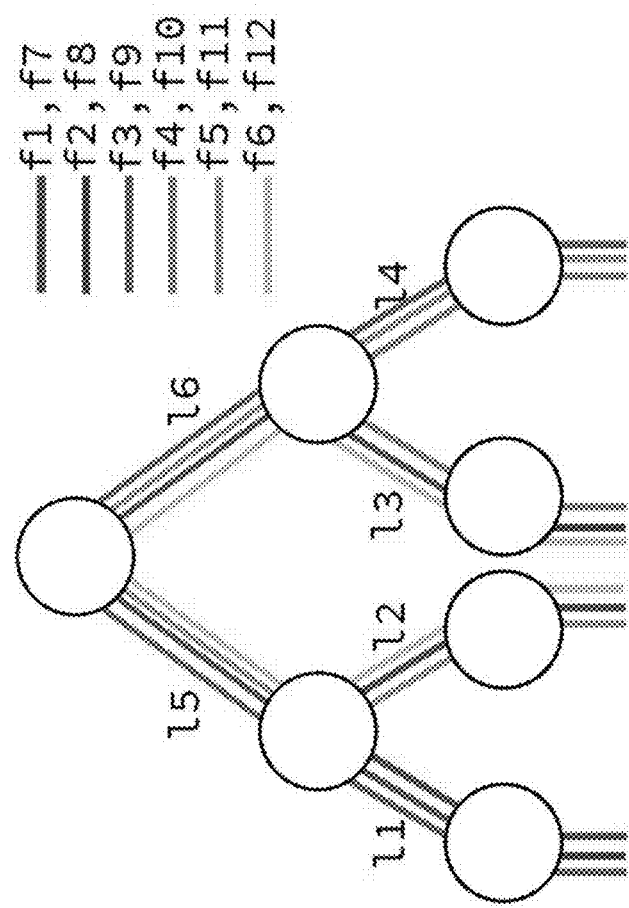
FIG. 10 depicts an example fat-tree network topology.

Consider the network topology in FIG. 10, which corresponds to a binary fat-tree with three levels and six links ($L=\{l_1, l_2, \ldots, l_6\}$). Assume also that there are two flows (one for each direction) connecting every pair of leaves in the fat-tree network, providing bidirectional full-mesh connectivity among the leaves. Since there are four leaves, that results in a total of 4×3=12 flows. All of the flows are routed following the shortest path, as shown in Table 2 below. For the sake of convention, we adopt the terminology from data center architectures and use the names spine and leaf links to refer to the upper and lower links of the fat-tree network, respectively.

TABLE 2

Path followed by each flow in the fat-tree networks experiments

| Flow | Experiment 1, 2,3: Links Traversed |
|---|---|
| $f_1$ | $\{l_1, l_2\}$ |
| $f_2$ | $\{l_1, l_5, l_6, l_3\}$ |
| $f_3$ | $\{l_1, l_5, l_6, l_4\}$ |
| $f_4$ | $\{l_2, l_1\}$ |
| $f_5$ | $\{l_2, l_5, l_6, l_3\}$ |
| $f_6$ | $\{l_2, l_5, l_6, l_4\}$ |
| $f_8$ | $\{l_3, l_6, l_5, l_2\}$ |
| $f_9$ | $\{l_3, l_4\}$ |
| $f_{10}$ | $\{l_4, l_6, l_5, l_1\}$ |
| $f_{11}$ | $\{l_4, l_6, l_5, l_2\}$ |
| $f_{12}$ | $\{l_4, l_3\}$ |

We fix the capacity of the leaf links to a value $\lambda$ (i.e., $c_{l_1}=c_{l_2}=c_{l_3}=c_{l_4}=\lambda$) and the capacity of the spine links to $\lambda \times \tau$ (i.e., $c_{l_5}=c_{l_6}=\lambda \times \tau$), where $\tau$ is used as a design parameter enabling a variety of network configurations. For instance, in our binary fat-tree example, the case $\tau=2\lambda$ corresponds to a full fat-tree network, because the total aggregate bandwidth at each level of the tree is constant, $c_{l_1}+c_{l_2}+c_{l_3}+c_{l_4}=c_{l_5}+c_{l_6}=4\lambda$. Similarly, the case $\tau=1$ corresponds to a thin-tree network, since it results with all the links having the same capacity, $c_{l_i}=\lambda$, for all $1 \le i \le 6$. The conventional technique of optimizing the performance-cost trade-off of a fat-tree network by adjusting the capacity of the spine links is sometimes referred as bandwidth tapering.

Figure 11A:
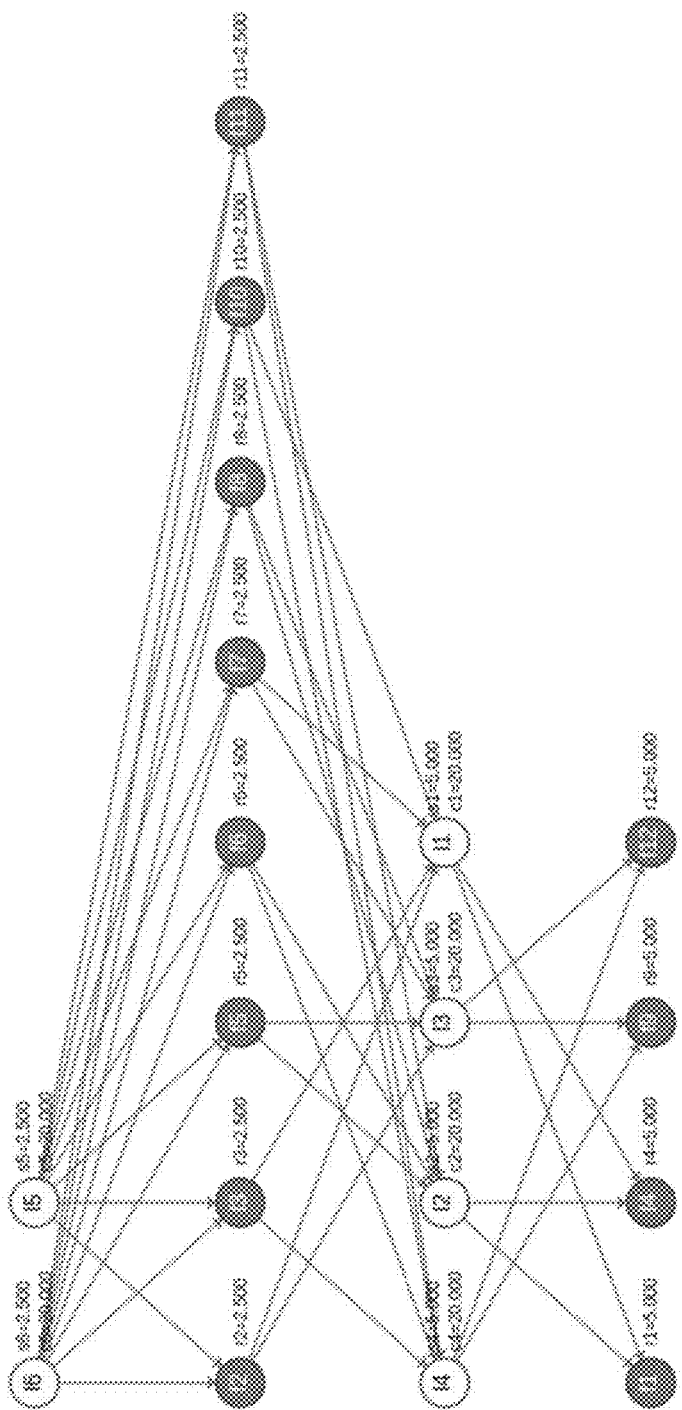
FIGS. 11A-11C depict different bottleneck structures resulting from allotting, according to different embodiments, different link capacities of certain links of the network of FIG. 9.
Figure 11B:
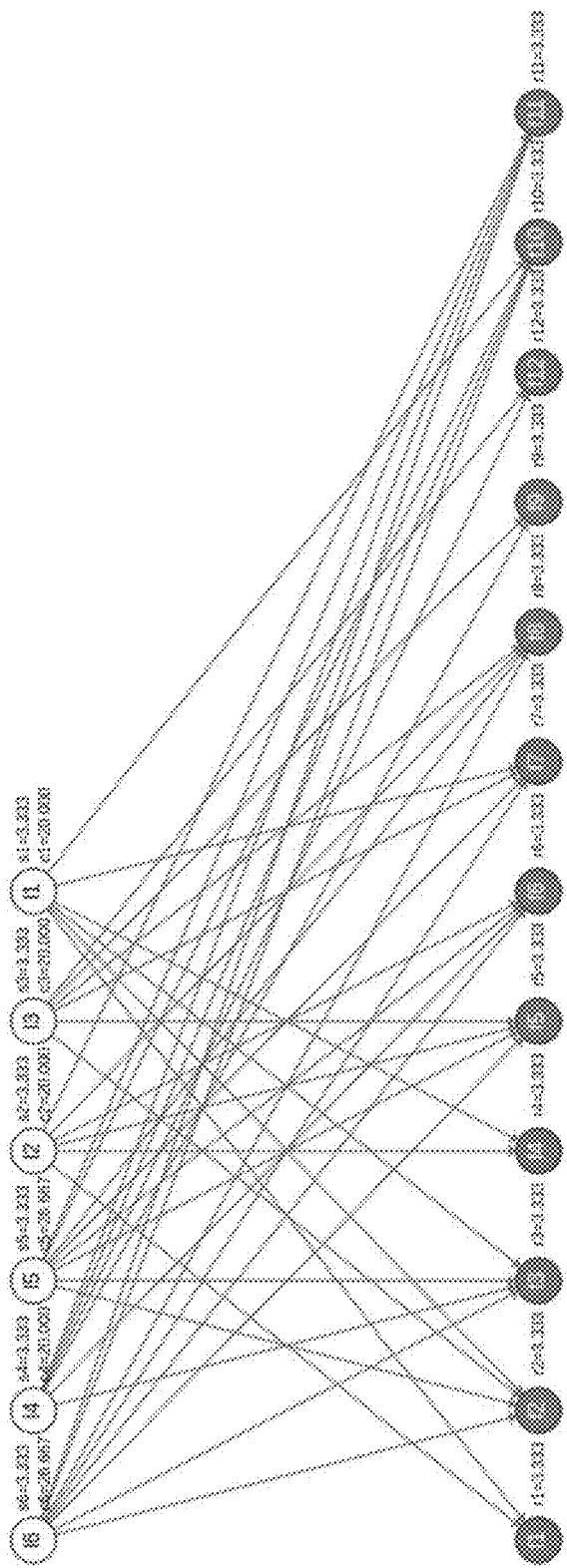
Figure 11C:
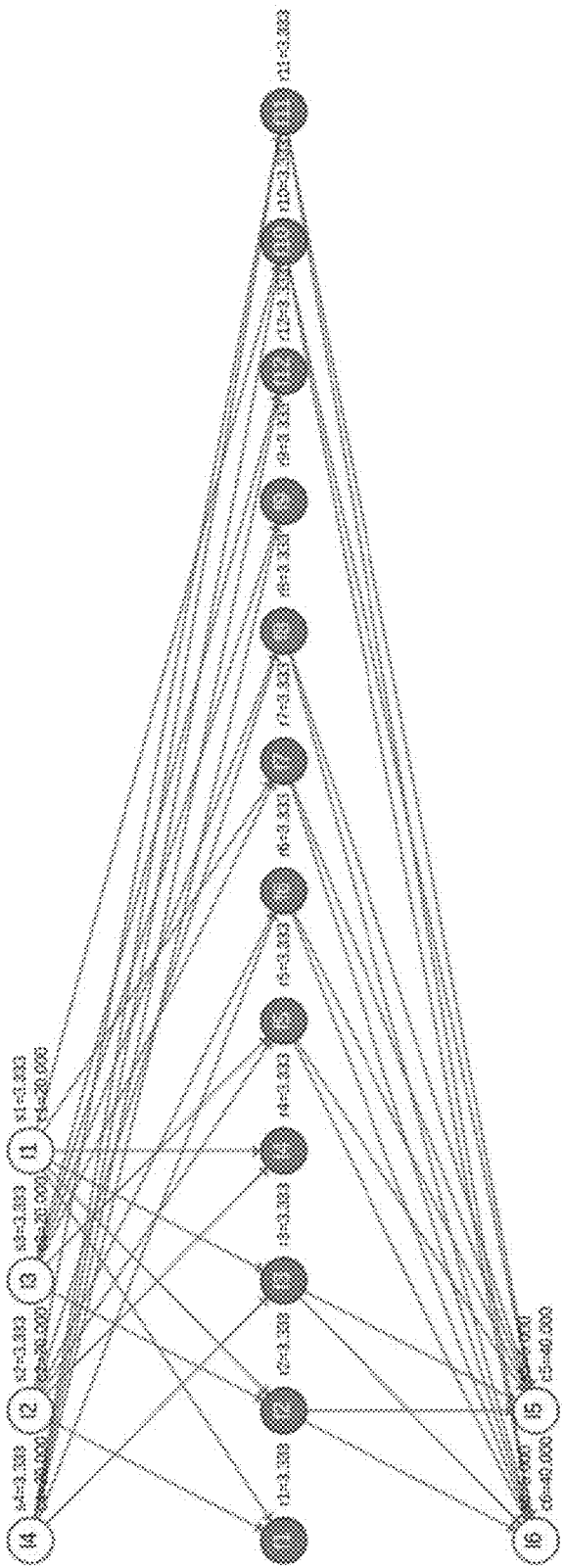

The focus of our experiment is to use the bottleneck structure analysis to identify optimized choices for the tapering parameter $\tau$. In FIGS. 11A-11C, we present sequences of bottleneck structures (e.g., obtained from running Algorithm 1B (FIG. 1B) corresponding to our fat-tree network with three different values of the tapering parameter τ and fixing λ=20. Note that the fixing of λ to this value is without loss of generality, as the following analysis applies to any arbitrary value λ>0.

The first bottleneck structure (FIG. 11A) corresponds to the case τ=1 (i.e., all links have the same capacity, $c_{l_i}$=20, for all 1≤i≤6). This solution leads to a bottleneck structure with flows confined in one of two possible levels: a top level, where flows perform at a lower rate, $r_{f_2}=r_{f_3}=r_{f_5}=r_{f_6}=r_{f_7}=r_{f_8}=r_{f_{10}}=r_{f_{11}}$=2.5; and a bottom level, where flows perform at twice the rate of the top-level flows, $r_{f_1}=r_{f_4}=r_{f_9}=r_{f_{12}}$=5. This configuration is thus unfair to those flows operating at the top bottleneck, which receive half the bandwidth of the flows at the bottom level. Furthermore, this configuration is also inefficient at supporting applications with symmetric workload patterns—where all nodes approximately send the same amount of bytes to each other—because the completion time of the slowest flows is significantly higher (twice as high since they get half the rate) than the faster flows. Let us next consider how we can use QTBS to identify a value of T that minimizes the maximum completion time of any of the flows under the assumption of symmetric workloads.

By looking at the bottleneck structure in FIG. 11B, we know that the slowest flows are confined in the top bottleneck level. In order to increase the rates of these flows, we need to increase the tapering parameter τ that controls the capacity of the spine links $l_5$ and $l_6$. Such action transforms the bottleneck structure by bringing the two levels closer to each other, until they fold. We can obtain the collision point by computing the link gradients and their leap and fold as follows. The link gradient of any of the spine links with respect to any of the top-level flows is $\nabla_l(f)$=0.125, for all l∈{$l_5$, $l_6$} and f∈{$f_2$, $f_3$, $f_5$, $f_6$, $f_7$, $f_8$, $f_{10}$, $f_{11}$}.

On the other hand, the link gradient of any of the spine links with respect to any of the low-level flows is $\nabla_l(f)$=−0.25, for all l∈{$l_5$, $l_6$} and f∈{$f_1$, $f_4$, $f_9$, $f_{12}$}. That is, an increase by one unit on the capacity of the spine links increases the rate of the top-level flows by 0.125 and decreases the rate of the low-level flows by 0.25. Since the rates of the top and low-level flows are 2.5 and 5, respectively, this means that the two levels will fold at a point where the tapering parameter satisfies the equation 2.5+0.125·τ·λ=5−0.25·τ·λ, resulting in $$\tau = \frac{4}{3}$$

and, thus, $c_{l_5}=c_{l_6}$=26.667.

Note that this value corresponds exactly to the leap of the spine links gradient, and thus can also be programmatically obtained using Algorithm 2 (FIG. 2). The resulting bottleneck structure for this configuration is shown in FIG. 11B, confirming the folding of the two levels. This fat-tree configuration is optimal in that the flow completion time of the slowest flow is minimal. Because the bottleneck structure is folded into a single level, this configuration also ensures that all flows perform at the same rate, $r_{f_i}$=3.333, for all 1≤i≤6.

What is the effect of increasing the tapering parameter above $$\frac{4}{3}?$$

This result is shown in FIG. 11C for the value of τ=2, i.e., $c_{l_5}=c_{l_6}$=40. In this case, the two spine links are no longer bottlenecks to any of the flows (since these links are leaves in the bottleneck structure), but all flows continue to perform at the same rate, $r_{f_i}$=3.333, for all 1≤i≤6. Thus, increasing the capacity of the upper-level links does not yield any benefit, but increases the cost of the network. This result indicates that the fat-tree network shown in FIG. 10 should not be designed with an allocation of capacity on the spine links higher than $$\tau = \frac{4}{3}$$

times the capacity of the leaf links.

In summary, for the fat-tree network shown in FIG. 10 we have:

A tapering parameter $$\tau \geq \frac{4}{3}$$

should not be used, since the resulting network is just as efficient as a design with $$\tau = \frac{4}{3},$$

but more costly.

A tapering parameter $$\tau = \frac{4}{3}$$

is optimal in that it minimizes the flow completion time of the slowest flow. This should be the preferred design in symmetric workloads that transfer about the same amount of data between any two nodes.

A tapering parameter $$\tau < \frac{4}{3}$$

can be used if workloads are asymmetric, identifying the right value of τ that produces the right amount of bandwidth at each level of the bottleneck structure according to the workload.

Figure 12B:
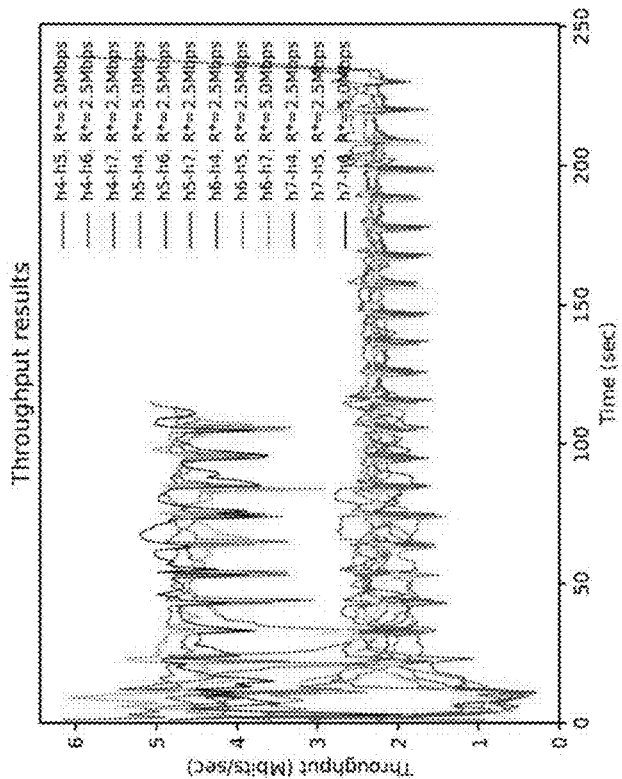
FIGS. 12A-12C illustrate the respective performance of network flows for the three bottleneck structures shown in FIGS. 11A-11C, using the BBR congestion control algorithm, according to some embodiments.
Figure 12A:
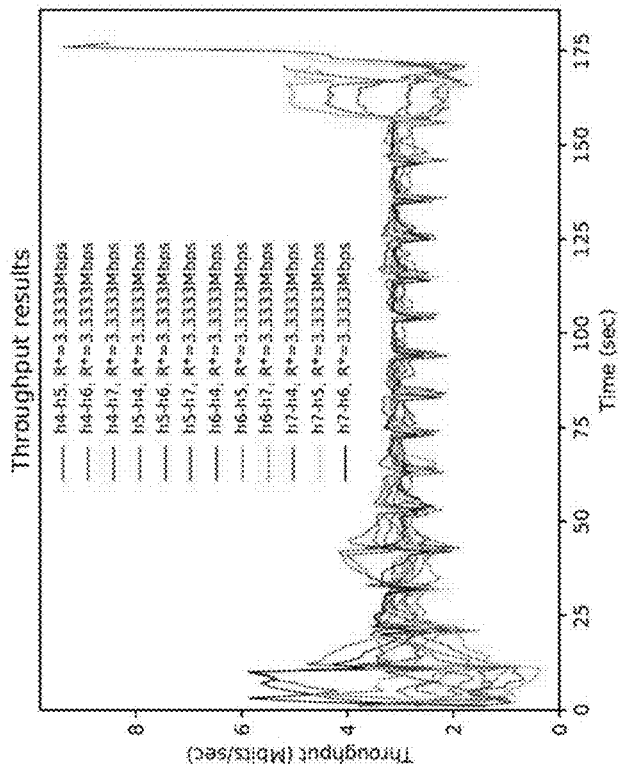
Figure 12C:
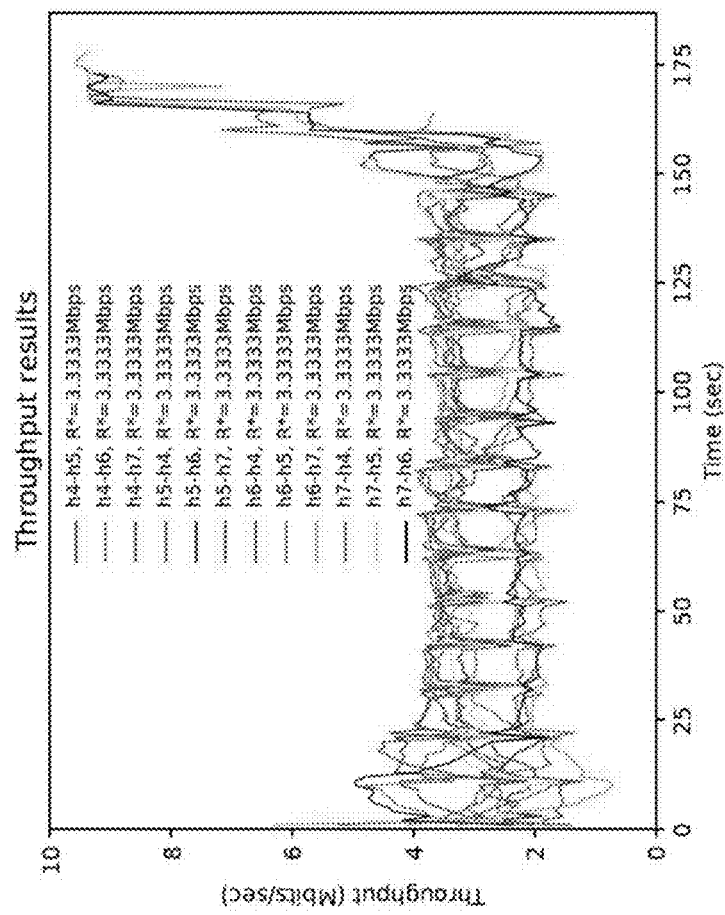

In the rest of this section, we empirically demonstrate the existence of an optimal fat-tree design at τ=4/3 using Mininet-Extensions-Anonymized configured with the congestion control algorithm BBR. FIGS. 12A-12C present the results of the experiments for the three values of the tapering parameter, $$\tau \in \left\{1, \frac{4}{3}, 2\right\}.$$

Each plot shows the transmission rate of all twelve flows as part of the network configuration, with each flow transmitting a total of 64 MB of data. Following the example in Section 3.2.1, the link capacities are set as follows: $c_{l_1}=c_{l_2}=c_{l_3}=c_{l_4}=\lambda=20$ Mbps and $c_{l_5}=c_{l_6}=\lambda\times\tau=20\times\tau$ Mbps.

TABLE 3

Flow completion times (seconds) of the fat-tree experiments

| Flow | $\tau=1$ | $\tau=4/3$ | $\tau=2$ | Flow | $\tau=1$ | $\tau=4/3$ | $\tau=2$ |
|---|---|---|---|---|---|---|---|
| $f_1$ | 115 | 172 | 175 | $f_7$ | 223 | 152 | 144 |
| $f_2$ | 237 | 171 | 164 | $f_8$ | 212 | 170 | 143 |
| $f_3$ | 239 | 177 | 156 | $f_9$ | 112 | 171 | 178 |
| $f_4$ | 111 | 172 | 173 | $f_{10}$ | 201 | 173 | 153 |
| $f_5$ | 236 | 167 | 158 | $f_{11}$ | 226 | 174 | 154 |
| $f_6$ | 223 | 172 | 147 | $f_{12}$ | 113 | 155 | 173 |
| Max( ) | | | | | 239 | 177 | 178 |

As predicated by QTBS, the case $\tau=1$ has flows operating at one of two bottleneck levels, close to the rates predicted by the bottleneck structure (2.5 Mbps for the upper-level flows and 5 Mbps for the lower-level flows, see FIG. 11A). This fat-tree design is inefficient for symmetric workloads since the flow completion time of the slowest flow is not minimal. Under this configuration, flow $f_3$ is the slowest flow and its completion time is 239 seconds. (See Table 3 for all flow completion time values).

If we want to maximize the rate of the slowest flow, QTBS tells us that the right tapering parameter value is 4/3. This case is presented in FIG. 12B, which indeed shows how all flows perform at a very similar rate close to the theoretical value of 3.333 Mbps (see FIG. 11B). This configuration is optimal in that it minimizes the maximum completion time of any of the flows. In this experiment, the completion time of the slowest flow is 177 seconds, an improvement of 25.9% with respect to the case of $\tau=1$.

FIG. 12C shows the results for the case of a full fat-tree network, $\tau=2$. Once again, as predicted by QTBS, this solution achieves about the same completion time as the case $\tau=4/3$ (the slowest flow completes in 178 seconds), since in this configuration the leaf links become the bottlenecks and the extra bandwidth added in the spine links does not produce any net benefit, as shown by the bottleneck structure in FIG. 11C. In summary, as predicted by QTBS, the case $\tau=4/3$ generally represents an optimal design in that it is the least costly network that minimizes the maximum completion time of any of the flows.

Note that the existence of an optimal design with a tapering parameter $\tau=4/3$ argues against some of the established conventional best practices in fat-tree networks. For instance, while a full fat-tree ($\tau=2$) is considered generally to be universally efficient, the analysis of its bottleneck structure demonstrates that such design is in general inefficient when flows are regulated by a congestion-control protocol. This is because the fairness and throughput maximization objectives targeted by the congestion control algorithm effectively bends the solution space and, as a result, the optimal fat-tree design deviates from the general full fat-tree configuration. This result has implications in the design of data centers that use fat-tree topologies (also known as folded-Clos). In this section, we have illustrated how QTBS can be used to optimize a simple fat-tree topology for the case of a symmetric workload pattern.

3.3 Traffic Engineering: Accelerating Time-Bound Constrained Flows

Suppose that our goal is to accelerate a flow $f_s \in F$ in a network N with the objective that such flow is completed before a certain time-bound requirement or a target time. A common application for the optimization of time-bound constrained flows can be found in research and education networks, where users need to globally share data obtained from their experiments, often involving terabytes or more of information—e.g., when scientists at the European Organization for Nuclear Research (CERN) need to share data with other scientific sites around the world using the LHCONE network. Another common use case can be found in large scale data centers, where massive data backups need to be transferred between sites to ensure redundancy. In this context, suppose the operators are only allowed to sacrifice the performance of a subset of flows $F' \subset F\{f_s\}$, considered of lower priority than $f_s$. What flows in F' present an optimal choice to traffic shape so as to accelerate $f_s$? By what amount should the rate of such flows be reduced? And by what amount will flow $f_s$ be accelerated?

Figure 13:
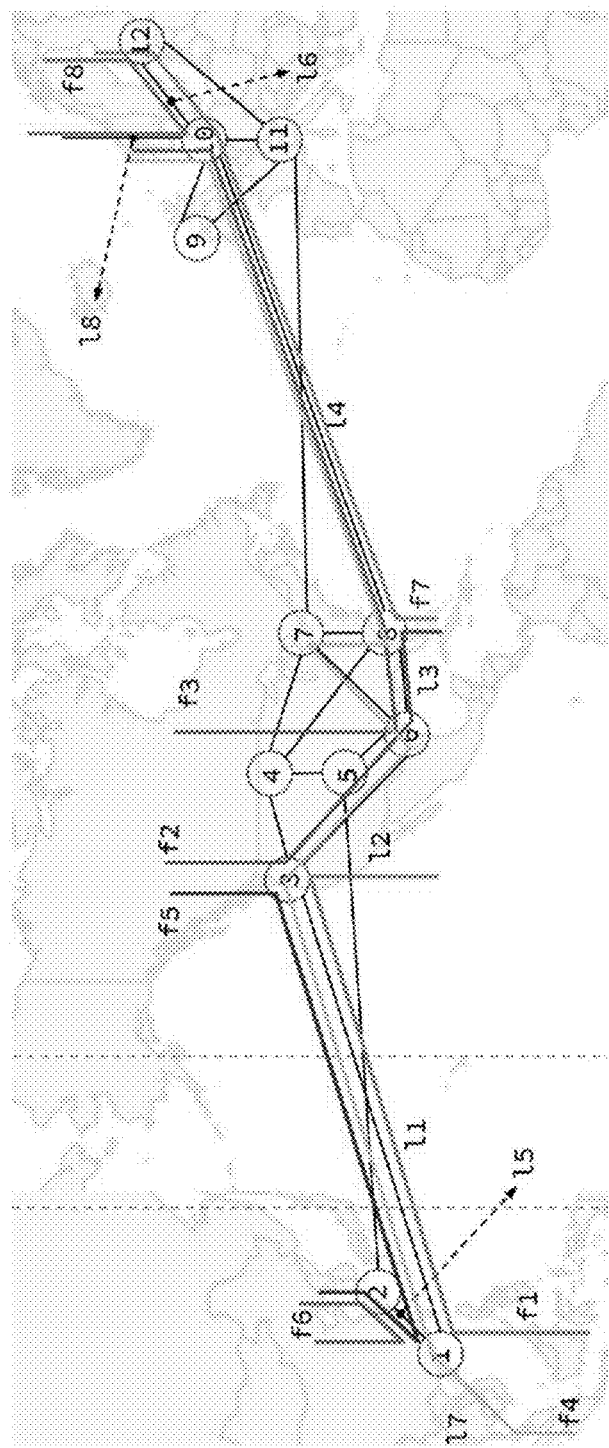
FIG. 13 depicts another topology of an example network.

To illustrate that we can use QTBS to resolve this class of problems, consider the network shown in FIG. 7 and introduced in Section 3.1. This topology generally corresponds to Google's B4 network. In this experiment, assume there are eight flows, $F=\{f_1, f_2, \ldots, f_8\}$, routed as shown in FIG. 13. While real-life networks usually operate with a much higher number of flows, in our example we use a reduced number merely to simplify the descriptions of the bottleneck structures and the steps followed to resolve the given problem. This is without loss of generality as we can apply the same procedure to optimize networks with arbitrary number of flows and topology. We will use the network's bottleneck structure to identify an optimal strategy for accelerating an arbitrary flow in a network. Assume that our objective is to accelerate flow $f_7$ (i.e., $f_s=f_7$) in FIG. 13—the transatlantic flow that connects data centers 8 and 12—to meet a certain flow completion time constraint. Assume also that in order to maximize the performance of $f_7$ we are allowed to traffic shape any of the flows in the set $F'=f_1, f_3, f_4, f_8$. In other words, the set of flows in F' are considered by the network operator to be of lower priority.

Figures 14A, 14B:
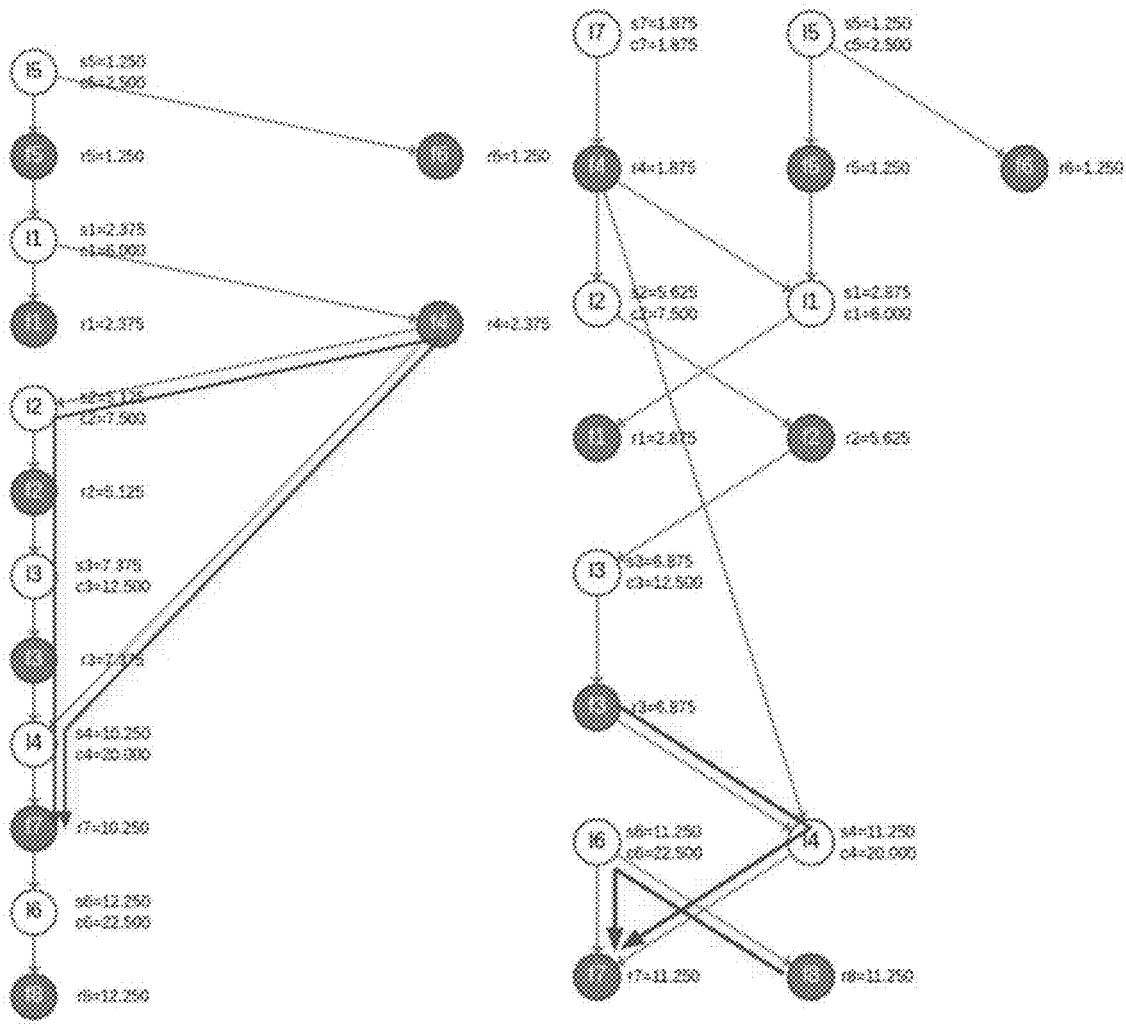
FIG. 14A shows a bottleneck structure of the network shown in FIG. 13.
FIGS. 14B and 14C show bottleneck structures of the network upon adding a flow to the network, according to different embodiments.

FIG. 13 displays the sequence of gradient graphs that lead to the acceleration of flow $f_7$ to meet its time constraint. The graphs include the values of the capacity $c_l$ and fair share $s_l$ next to each link vertex l and the rate $r_f$ next to each flow vertex f. FIG. 14A corresponds to the gradient graph of the initial network configuration shown in FIG. 13 as computed by Algorithm 1. From Theorem 2.5, we know that only the flows that are ancestors to $f_7$ can have an effect on its performance. That means we can discard traffic shaping flow $f_8$ as that will have no impact. We can use the Forward-Grad( ) algorithm (Algorithm 2) to obtain the gradients of flow $f_7$ with respect to the flows in the low priority set F': $\nabla_{f_1}(f_7)=-2$, $\nabla_{f_2}(f_7)=-1$, $\nabla_{f_3}(f_7)=1$, $\nabla_{f_4}(f_7)=2$, $\nabla_{f_5}(f_7)=-1$, $\nabla_{f_6}(f_7)=1$, $\nabla_{f_8}(f_7)=0$.

We are interested in finding the gradient of a flow in F that has the highest negative value, so that the traffic shaping of such a flow (i.e., the reduction of its rate) creates a maximal positive increase in the rate of $f_7$. We have that flow $f_4$ has the highest negative gradient with a value of $-2$, yielding an optimal traffic shaping decision. From FIG. 14A, it can be observed that the reduction of flow $f_4$'s rate creates a perturbation that propagates through the bottleneck structure via two different paths: $f_4 \to l_2 \to f_2 \to l_3 \to f_3 \to l_4 \to f_7$ and $f_4 \to l_4 \to f_7$. Each of these paths has an equal contribution to the gradient of value 1, resulting in $\nabla_{f_4}(f_7)=2$. Note that since this value is larger than 1, it is understood to be a power gradient (Definition 2.10).

We can use the bottleneck structure again to calculate the exact value of the traffic shaper—i.e., the rate reduction applied to flow $f_4$. The core idea is that traffic shaping flow $f_4$ may be an optimal decision as long as the bottleneck structure does not change, since a change in the structure would also imply a change in the gradients. As the rate of flow $f_4$ is reduced, some levels in the bottleneck structure will become further away from each other, while the others will become closer to each other. Thus, the latter set will fold if the rate reduction imposed by the traffic shaper is large enough. The speed at which two links in the bottleneck structure get closer to (or further away from) each other is given by their gradients. In particular, if the traffic shaper reduces the rate of flow $f_4$ by an amount of $\rho$ bps, then two links l and l' in the bottleneck structure will collide at a value of $\rho$ that satisfies the equation $s_l - \rho \cdot \nabla_{f_4}(l) = s_{l'} - \rho \cdot \nabla_{f_4}(l')$.

From the bottleneck structure (FIG. 14A) we can obtain the fair share values $s_l$ and using the ForwardGrad( ) algorithm we can compute the link gradients $\nabla_{f_4}(l)$: $s_{l_2}=5.125$; $s_{l_3}=7.375$; $s_{l_4}=10.25$; $s_{l_6}=12.25$; $\nabla_{f_4}(l_2)=-1$; $\nabla_{f_4}(l_3)=1$; $\nabla_{f_4}(l_4)=-2$; $\nabla_{f_4}(l_6)=2$. Using these values, we have that the smallest value of $\rho$ that satisfies the collision equation corresponds to the case $l=l_4$ and $l'=l_6$, yielding a $\rho$ value of 0.5 (since $10.25-\rho \cdot (-2)=12.25-\rho \cdot 2 \Rightarrow \rho=0.5$).

Thus, we conclude that to maximally increase the rate of flow $f_7$, an optimal strategy is to decrease the rate of flow $f_4$ by an amount of 0.5 units of bandwidth. The resulting bottleneck structure is presented in FIG. 14B, where a new link $l_7$ has been added that corresponds to the new traffic shaper set to reduce the rate of flow $f_4$ by an amount of 0.5 (from 2.375 down to 1.875). Note that as expected, in this new bottleneck structure links $l_4$ and $l_6$ are folded into the same level and have the same fair share: $s_4=s_6=11.25$. Since $f_7$ has now two bottleneck links ($l_4$ and $l_6$), we cannot accelerate it further unless we increase the fair-shares of both. Using the new bottleneck structure (FIG. 14B), it can be seen that this can be achieved by decreasing the rate of flows $f_3$ and $f_8$, since the resulting link gradients are each negative $\nabla_{f_3}(l_4)=\nabla_{f_8}(l_6)=-1$.

Figure 14C:
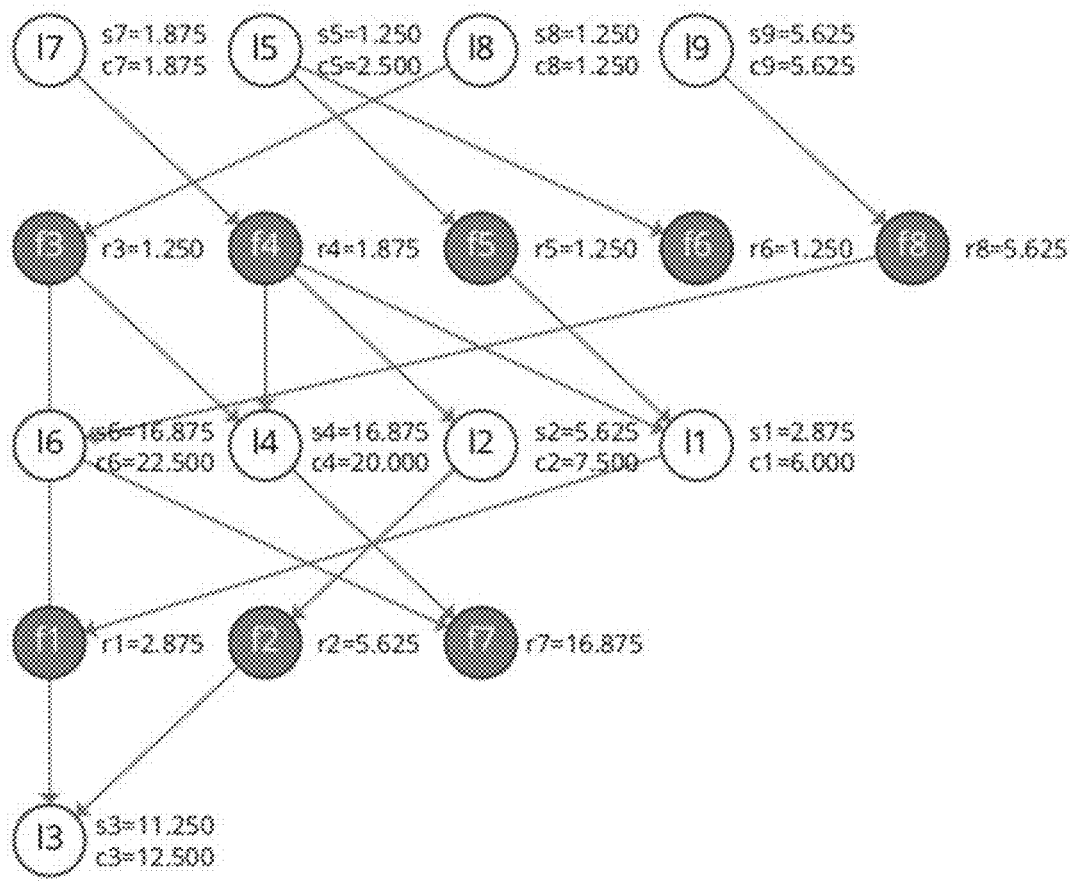

Therefore, we add two new traffic shapers $l_8$ and $l_9$ to throttle the rate of flows $f_3$ and $f_8$, respectively, down from their current rates of 6.875 and 11.25. That is: $c_{l_8}=6.875-\rho$ and $c_{l_9}=11.25-\rho$, for some traffic shaping amount $\rho$. In FIG. 14C, we show the resulting bottleneck structure when choosing a value of $\rho=5.625$ (so $c_{l_8}=1.25$ and $c_{l_9}=5.625$), which further accelerates the rate of flow $f_7$ to $r_7=s_{l_4}-\rho \cdot \nabla_{f_3}(l_4)=s_{l_6}-\rho \cdot \nabla_{f_8}(l_6)=11.25-5.625 \cdot (-1)=16.875$. Note that there is some flexibility in choosing the value of this parameter, depending on the amount of acceleration required on flow $f_7$. In this case, we chose a value that maximally accelerates flow $f_7$ while ensuring none of the flows that are traffic shaped receives a rate lower than any other flow. With this configuration, flow $f_3$'s rate is reduced to the lowest transmission rate among all flows in the network, but this value is no lower than the rate of flows $f_5$ and $f_6$ ($r_{f_3}=r_{f_5}=r_{f_6}=1.25$). Thus, the flow completion time of the slowest flow is preserved throughout the transformations performed in this example. This strategy also allows preserving or maintaining the relative order of links according to their respective fair shares.

In summary, a strategy to accelerate the performance of flow $f_7$ includes traffic shaping the rates of flows $f_3$, $f_4$ and $f_8$ down to 1.25, 1.875, and 5.625, respectively. Such a configuration results in a theoretical increase to the rate of flow $f_7$ from 10.25 to 16.875, while ensuring no flow performs at a rate lower than the slowest flow in the initial network configuration. Note that among all the low priority flows in F', in the above process we opted for not reducing the rate of flow $f_1$. Indeed, the three bottleneck structures (FIGS. 14A-14C) computed by this algorithm tell us that choosing to reduce the rate of flow $f_1$ would in fact have either a negative effect or no effect at all on the rate of flow $f_7$, since the gradients $\nabla_{f_1}(f_7)$ for each structure are 2, 0, and 1, respectively. In other words, a reduction on the rate of flow $f_1$ produces a non-positive impact on the rate of flow $f_7$ in all cases.

Thus, the quantitative analysis resulting from the bottleneck structure of the network reveals not only the set of flows that should be traffic shaped, but also the flows that should not be traffic shaped, as doing so would actually hurt the performance of the flow we intend to accelerate. Note that this result challenges some of the established best practices for traffic engineering flows, which include many proposed algorithms that focus on reducing the rate of the heavy-hitter flows to improve high-priority flows. As shown in this example, without taking into account the bottleneck structure of a network, such algorithms may recommend a traffic shaping configuration that actually has the opposite of the intended effect.

Figure 15A:
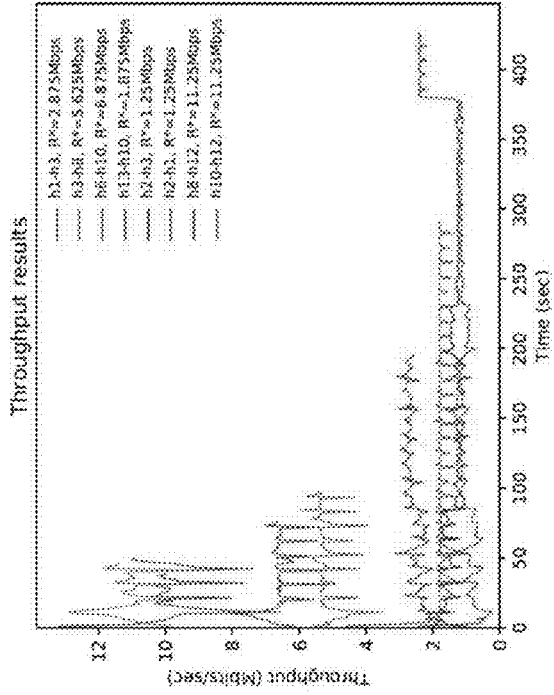
FIG. 15A shows the rate of a flow without traffic shaping.
Figure 15B:
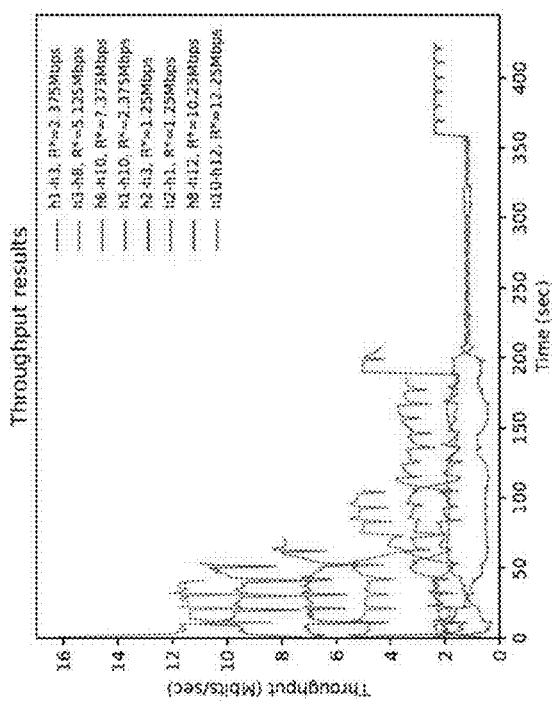
FIGS. 15B-15C show the respective rates of a flows in response to respective traffic-shaping strategies, according to two different embodiments.
Figure 15C:
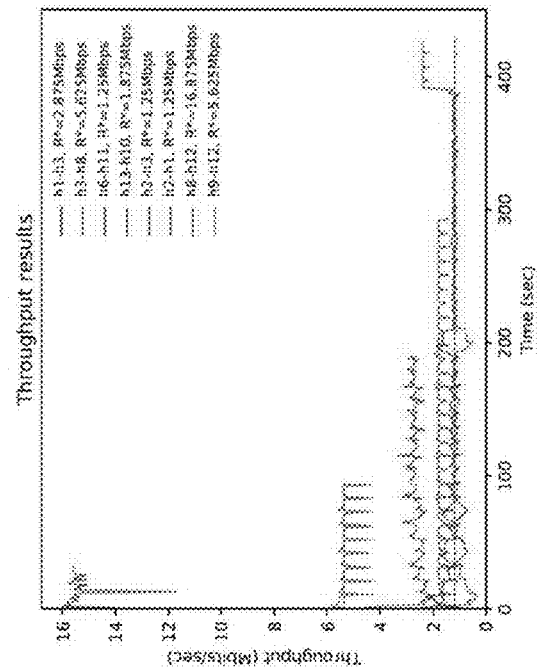

To empirically demonstrate the accuracy of QTBS in identifying the set of traffic shapers and their optimal rate, we reproduce the experiments described in this section using Mininet-Extensions-Anonymized. FIGS. 15A-15C illustrates the performance of the flows for each of the three traffic shaping configurations shown in FIGS. 14A-14C using the BBR congestion control algorithm. The legends in these figures describe the flows, where the notation $h_x$-$h_y$ means that the flow goes from host $h_x$ to host $h_y$. To map the flows according to FIG. 13, we use the convention that host $h_x$ is located in data center x. For instance, flow $h_8$-$h_{12}$ in FIGS. 15A-15C corresponds with flow $f_7$ in FIG. 13, which starts at datacenter 8 and ends at datacenter 12.

Table 4 shows the average transmission rate obtained for each of the flows and for each of the three experiments. Next to each experimental rate value, this table also includes the theoretical flow transmission rate according to the bottleneck structure. It can be seen that these values match the transmission rate $r_f$ shown next to each flow vertex (gray vertices) from the corresponding bottleneck structures in FIGS. 14A-14C.

TABLE 4

Experimental versus theoretical average flow transmission rate (units in Mbps).

| Flow | Experiment 1 | Experiment 2 | Experiment 3 |
| --- | --- | --- | --- |
| $f_1$ | 2.44/2.37 | 2.57/2.87 | 2.65/2.87 |
| $f_2$ | 4.78/5.12 | 5.16/5.62 | 5.33/5.62 |
| $f_3$ | 6.99/7.37 | 6.57/6.87 | 1.18/1.25 |
| $f_4$ | 2.72/2.37 | 1.74/1.87 | 1.73 1.87 |
| $f_5$ | 1.18/1.25 | 1.33/1.25 | 1.29/1.25 |
| $f_6$ | 1.42/1.25 | 1.19/1.25 | 1.19/1.25 |
| $f_7$ | 9.51/10.25 | 9.81/11.25 | 15.34/16.87 |
| $f_8$ | 11.48/12.25 | 11.06/11.25 | 5.27/5.62 |

FIG. 15A shows the results of running the initial network without any traffic shapers, corresponding to the bottleneck structure in FIG. 14A. From Table 4, we see that all experimentally measured flow rates usually track their theoretical value from slightly below. Such an offset between experimental and theoretical rates is a characteristic that holds for all experiments, and is due to imperfections in the distributed nature of the congestion control algorithm (e.g., due to its inability to instantaneously converge to the optimal transmission rate or due to statistical packet drops produced by the asynchronous nature of the network). However, the table clearly demonstrates that the experimental rates behave according to the bottleneck structure of the network. This result is also reinforced by the fact that Jain's fairness index is above 0.99 for all experiments, as shown in Table 5.

TABLE 5

Jain's fairness index for all three experiments

| Algorithm | 3.3:Experiment 1 | 3.3:Experiment 2 | 3.3:Experiment 3 |
|---|---|---|---|
| BBR | 0.9926 | 0.9965 | 0.9985 |
| Cubic | 0.9353 | 0.9074 | 0.9218 |

| Algorithm | 3.1:Experiment 1 | 3.1:Experiment 2 | |
|---|---|---|---|
| BBR | 0.9954 | 0.9966 | |
| Cubic | 0.9077 | 0.8868 | |

| Algorithm | $3.2: \tau = 1$ | $3.2: \tau = \frac{4}{3}$ | $3.2: \tau = 2$ |
|---|---|---|---|
| BBR | 0.9987 | 0.9983 | 0.9939 |
| Cubic | 0.9903 | 0.9842 | 0.9957 |

FIG. 15B shows the result of adding the first traffic shaper, configured to reduce the rate of flow $f_4$ by an amount of 0.5 Mbps. As predicted by QTBS, this increases the rate of flow $f_7$ (the flow $h_8$–$h_{12}$ in FIGS. 15A-15C), in this case from 9.51 to 9.81 Mbps (Table 4). FIG. 15C shows the result of adding two additional traffic shapers to reduce the rate of flows $f_3$ and $f_4$ by a an amount of 5.625 Mbps, according to our quantitative analysis of the bottleneck structure. Recall that this configuration was designed to ensure a maximal increase in the rate of flow $f_7$ without decreasing any of the flows' rate below the rate of the slowest flow. We see this behavior in FIG. 15C, where flow $f_7$ has now the highest rate, while the flow completion time of the slowest flow remains at slightly above 400 seconds, throughout the three experiments (FIGS. 15A-15C). In summary, the combined effect of the three traffic shapers accelerates the observed rate of flow $f_7$ from 9.51 to 15.34 Mbps. As shown in Table 4, this result closely matches the behavior predicted by the bottleneck structure—that the rate would increase from 10.25 to 16.87 Mbps, while the observed maximum flow completion time of the network remains substantially (e.g., within a tolerance of 0.1%, 1%, 2%, 5%, 10%, etc.) constant throughout the three experiments.

6 Conclusions

The analytical strength of a bottleneck structure stems from its ability to capture the solution-space produced by a congestion-control algorithm taking into account the topological and routing constraints of the network. Based on this concept, we develop a quantitative theory of bottleneck structures (QTBS), a new mathematical framework that allows to optimize congestion-controlled networks by providing very efficient algorithms to compute derivatives on the performance parameters of links and flows. To explore the analytical power of QTBS, we use it to reveal insights in traffic engineering and network design problems that are themselves contributions to the literature. In one experiment, we use QTBS to develop a novel routing algorithm that identifies maximal throughput paths, enabling a scalable methodology to jointly solve the problems of routing and congestion control. In another experiment, we use QTBS to reveal the existence of optimal capacity allocations in the spine links of a fat-tree network that outperform (in cost and/or performance) the traditional full fat-tree network designs found in some large-scale data centers and supercomputers. In a third experiment, we demonstrate how to use bottleneck structures to compute the numerical values of optimal rate settings in traffic shapers to help improve the performance of high-priority flows. We present the concept of bottleneck structures as a promising analytical framework to optimize network performance. In general, this technique can be applied to any system that can be modeled as a network.

The overall network analysis and/or manipulation or control processes described herein begin with the collection of network information including flow information, link information, and topology. The flow information generally includes the identities of flow, the total count of flows, and the rates of the identified flows during a specified observation window, which can be a few minutes, a few hours, a few days, or longer. The link information includes the number of active links, their identities, and their designated and/or maximum capacities during the specified observation window. The network topology includes the network nodes and the links, typically direct links, interconnecting such nodes.

In case of data networks, the nodes may be data centers and/or computing centers, the links include data links, whether cable, wireless, or satellite based, the flow rates may include number of bits, bytes, packets, etc., passing through the links, and link capacities may be expressed in terms of available or allotted bandwidth or bit rate. In case of transportation networks, the nodes can be cities, locations within cities or a metropolitan area, airports, marine ports, etc., the links can be roadways, railways, subway routes, airline routes, marine routes, etc., the flow rates and link capacities can be expressed in terms of the number of passengers or travelers, the number of vehicles, etc.

In case of energy networks, the nodes can be energy generators such as power plants and consumers, such as towns, cities, industrial complexes, shopping centers, etc. The links include energy delivery systems including high-voltage transmission lines, substations, local energy distribution lines, etc. The flow rates and link capacity can be expressed in terms of peak energy demand, average energy demand, etc.

In case of fluidic or biological networks, the nodes can be sources and consumers of material, such as oil, gas, nutrients, blood, etc., and the link capacity can be the sizes of conduits or vessels carrying the fluids or biological materials, the pressure in such conduits or vessels, etc. In some cases, the capacity and/or rate of flow in one or more conduits/vessels can be adjusted by shutting off or pruning other conduits/vessels. The flow rate optimization and/or capacity planning can thus be used to manage or control irrigation systems, fertilizer delivery system, plant/crop disease control systems, etc.

After collecting the required information, the Gradient-Graph that includes various flow and link gradients is generated using embodiments of Algorithms 1A or 1B (FIG. 1A or 1B). The derivation of the GradientGraph may include efficient memory allocation, as described above in Section 3. For one or more links and/or flows of interest the respective leaps and folds are then computed using embodiments of Algorithm 2 (FIG. 3). Using the leaps and folds, one or more flows and/or one or more links may be selected for traffic shaping, i.e., for an adjustment to a property of the selected flow(s) or link(s). In particular, the rate of a flow may be decreased up to a corresponding leap and/or the allotted capacity of a link may be increased or decreased. It should be noted that the allotted capacity of link cannot exceed the physical capacity of the link.

The effect of this perturbation can be observed on the flow(s) and/or link(s) of interest, and the process may be repeated a specified number of times, until a desired effect (e.g., increase in the rate of a flow of interest) is attained, or a maximum feasible change can be attained. Such iterations may be performed under constraints, such as not permitting the flow rate of any flow below the current minimum or a specified lower-bound rate, maintaining the relative order of the flow rates, allotting at least a specified lower-bound capacity to each link, etc.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for jointly performing routing and congestion control in a system modeled as a network, the method comprising performing by a processor the steps of:
   receiving, for a system modeled as a network, a network topology, the network topology comprising a plurality of nodes, a plurality of links between respective pairs of nodes, and a plurality of flows via the plurality of links;
   receiving a request for routing a flow between a source node and a destination node;
   selecting a path for the flow based on a maximum achievable flow rate therefor, wherein the maximum achievable flow rate is derived by generating a bottleneck structure of the network modified to have the network topology and the flow.

2. The method of claim 1, wherein the flow comprises a new flow.

3. The method of claim 1, wherein the flow comprises an existing flow, the method further comprising:
   before the selecting step, removing the existing flow from the plurality of flows in the network topology.

4. The method of claim 1, wherein:
   each link in the plurality of links represents a respective availability of a system resource; and
   a respective flow rate associated with each flow in the plurality of flows represents a respective utilization of one or more system resources.

5. The method of claim 1, wherein the selected path is different from a shortest hop path between the source node and the destination node.

6. The method of claim 1, wherein the bottleneck structure comprises a plurality of link elements and a plurality of flow elements, wherein:
   a dependence from a first link element to a first flow element indicates that a first flow corresponding to the first flow element is bottlenecked at a first link corresponding to the first link element; and
   a dependance from a second flow element to a second link element indicates that a second flow corresponding to the second flow element traverses a second link corresponding to the second link element.

7. The method of claim 1, further comprising:
   selecting, from the plurality of flows, a flow to be accelerated;
   determining, by traversing the bottleneck structure, a target flow associated with a positive flow gradient;
   computing a leap and a fold for the target flow, the leap representing a maximum perturbation of flow rate of the target flow while maintaining the relative order of the plurality of links according to their respective fair shares;
   reducing flow rate of the target flow using a traffic shaper by a factor up to the leap; and
   increasing flow rate of the flow to be accelerated up to a product of the leap and a gradient of the flow to be accelerated.

8. The method of claim 7, wherein the factor is selected to preserve completion time of slowest of the plurality of flows.

9. The method of claim 7, further comprising repeating the determining, computing, reducing, and increasing steps with respect to a different target flow.

10. The method of claim 1, wherein the system modeled as a network comprises system modeled as: a data network, a transportation network, an energy distribution network, a fluidic network, or a biological network.

11. An apparatus for jointly performing routing and congestion control in a system modeled as a network, the apparatus comprising:
   a first processor; and
   a first memory in electrical communication with the first processor, and comprising instructions that, when executed by a processing unit that comprises one or more computing units, wherein one of the one or more computing units comprises the first processor or a second processor, and wherein the processing unit is in electronic communication with a memory module that comprises the first memory or a second memory, program the processing unit to:
      receive, for a system modeled as a network, a network topology, the network topology comprising a plurality of nodes, a plurality of links between respective pairs of nodes, and a plurality of flows via the plurality of links;
      receive a request for routing a flow between a source node and a destination node;
      select a path for the flow based on a maximum achievable flow rate therefor, wherein the maximum achievable flow rate is derived by generating a bottleneck structure of the network modified to have the network topology and the flow.

12. The apparatus of claim 11, wherein the flow comprises a new flow.

13. The apparatus of claim 11, wherein:
   the flow comprises an existing flow; and
   the instructions further program the processing unit to:
      before performing the select operation, remove the existing flow from the plurality of flows in the network topology.

14. The apparatus of claim 11, wherein:
   each link in the plurality of links represents a respective availability of a system resource; and
   a respective flow rate associated with each flow in the plurality of flows represents a respective utilization of one or more system resources.

15. The apparatus of claim 11, wherein the selected path is different from a shortest hop path between the source node and the destination node.

16. The apparatus of claim 11, wherein the bottleneck structure comprises a plurality of link elements and a plurality of flow elements, wherein:
   a dependence from a first link element to a first flow element indicates that a first flow corresponding to the first flow element is bottlenecked at a first link corresponding to the first link element; and
   a dependance from a second flow element to a second link element indicates that a second flow corresponding to the second flow element traverses a second link corresponding to the second link element.

17. The apparatus of claim 11, wherein the instructions further program the processing unit to:
   select, from the plurality of flows, a flow to be accelerated;
   determine, by traversing the bottleneck structure, a target flow associated with a positive flow gradient;
   compute a leap and a fold for the target flow, the leap representing a maximum perturbation of flow rate of the target flow while maintaining the relative order of the plurality of links according to their respective fair shares;

reduce flow rate of the target flow using a traffic shaper by a factor up to the leap; and increase flow rate of the flow to be accelerated up to a product of the leap and a gradient of the flow to be accelerated.

18. The apparatus of claim 17, wherein the factor is selected to preserve completion time of slowest of the plurality of flows.

19. The apparatus of claim 17, wherein the instructions further program the processing unit to repeat the determine, compute, reduce, and increase operations with respect to a different target flow.

20. The apparatus of claim 11, wherein the system modeled as a network comprises system modeled as: a data network, a transportation network, an energy distribution network, a fluidic network, or a biological network.

* * * * *